(12) United States Patent
Nagae

(10) Patent No.: US 6,198,552 B1
(45) Date of Patent: *Mar. 6, 2001

(54) COLOR IMAGE INFORMATION PROCESSING SYSTEM, USING COLOR IMAGE INFORMATION TO WHICH ACHROMATIC COLOR INFORMATION IS APPENDED, AND INPUT DEVICE AND OUTPUT DEVICE EMPLOYED IN SAME

(75) Inventor: Takeshi Nagae, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,851

(22) Filed: Feb. 9, 1998

(30) Foreign Application Priority Data

Aug. 1, 1997 (JP) ...................................................... 9-208151

(51) Int. Cl.[7] ........................................................ G03F 3/08
(52) U.S. Cl. ........................... 358/518; 358/515; 358/520; 382/162; 382/167
(58) Field of Search .................................... 382/162, 167; 358/518, 520, 523, 515, 519, 536

(56) References Cited

U.S. PATENT DOCUMENTS 5,668,890 * 9/1997 Winkelman ........................... 382/167
5,767,991 * 6/1998 Hara ...................................... 358/518
5,767,992 * 6/1998 Tanaka et al. ........................ 358/520
5,818,613 * 10/1998 Masterson et al. .................. 358/520

FOREIGN PATENT DOCUMENTS 2-051979   2/1990  (JP) .
6-078138   3/1994  (JP) .
6-110987   4/1994  (JP) .

* cited by examiner

Primary Examiner—Edward L. Coles
Assistant Examiner—Mark Wallerson
(74) Attorney, Agent, or Firm—Staas & Halsey LLP

(57) ABSTRACT

Disclosed is a color image processing system making it easy to carry out color management while taking account of the use environment and tastes of a user of any device. The color image processing system comprises a color image information input device, a color image information output device, an inherent color space-to-common color space conversion feature for converting color image information produced by the color image information input device and expressed in a color space inherent to the color image information input device into color image information expressed in a given color space, a first achromatic color information processing feature for adjust color image information converted to be expressed in the given color space by means of the inherent color space-to-common color space conversion feature so that an achromatic-color portion of the color image information will have a value indicating an achromatic color in the given color space, a common color space-to-inherent color space conversion feature for converting color image information expressed in the given color space into color image information expressed in the color space inherent to the color image information output device, and a second achromatic color information processing feature for adjusting color image information to be converted by the common color space-to-inherent color space conversion feature and expressed in the given color space so that a portion of the color image information having a value indicating an achromatic color will represent the achromatic color.

44 Claims, 22 Drawing Sheets

Fig.5

| R | G | B | L* | a* | b* |
|---|---|---|---|---|---|
| 0 | 0 | 0 | 0 | 2 | 3 |
| 0 | 0 | 16 | 1 | 6 | -5 |
| 0 | 0 | 32 | 2 | 11 | -15 |
| 0 | 0 | 48 | 3 | 16 | -26 |
| ⋮ | ⋮ | ⋮ | ⋮ | ⋮ | ⋮ |
| 255 | 255 | 255 | 95 | 0 | 1 |

Fig.6A
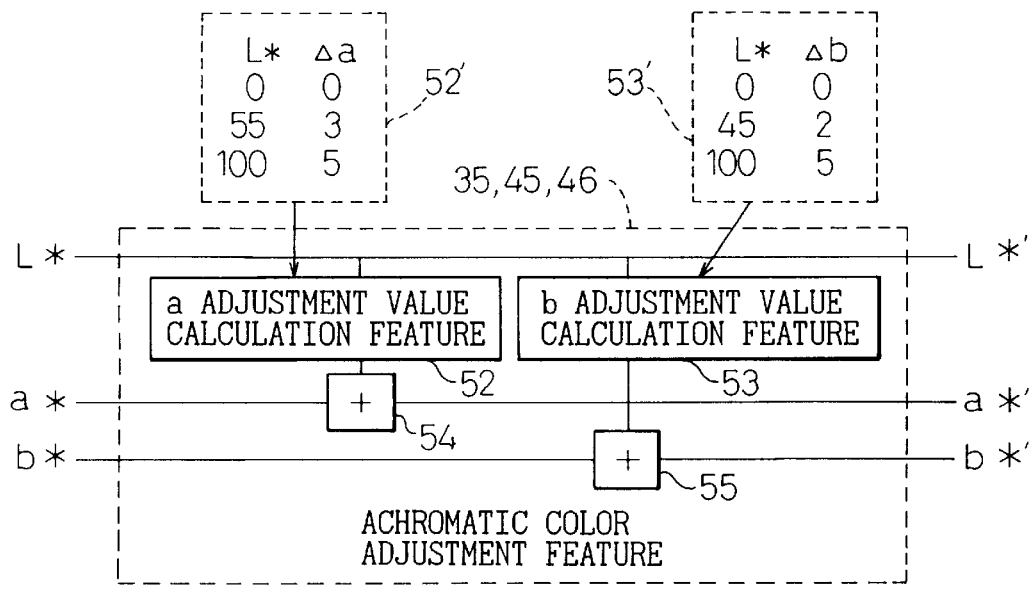
Fig.6B
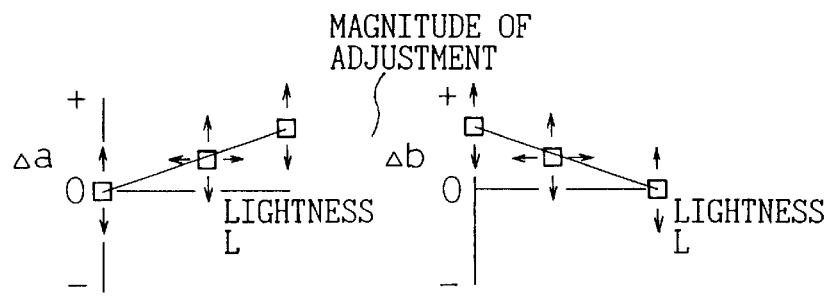
Fig.6C
| L* | Δa | Δb |
|---|---|---|
| 0 | -2.0 | -3.0 |
| 10 | -1.8 | -2.8 |
| 20 | -1.6 | -2.6 |
| 30 | -1.4 | -2.4 |
| ⋮ | | |
| 100 | 0.0 | -1.0 |

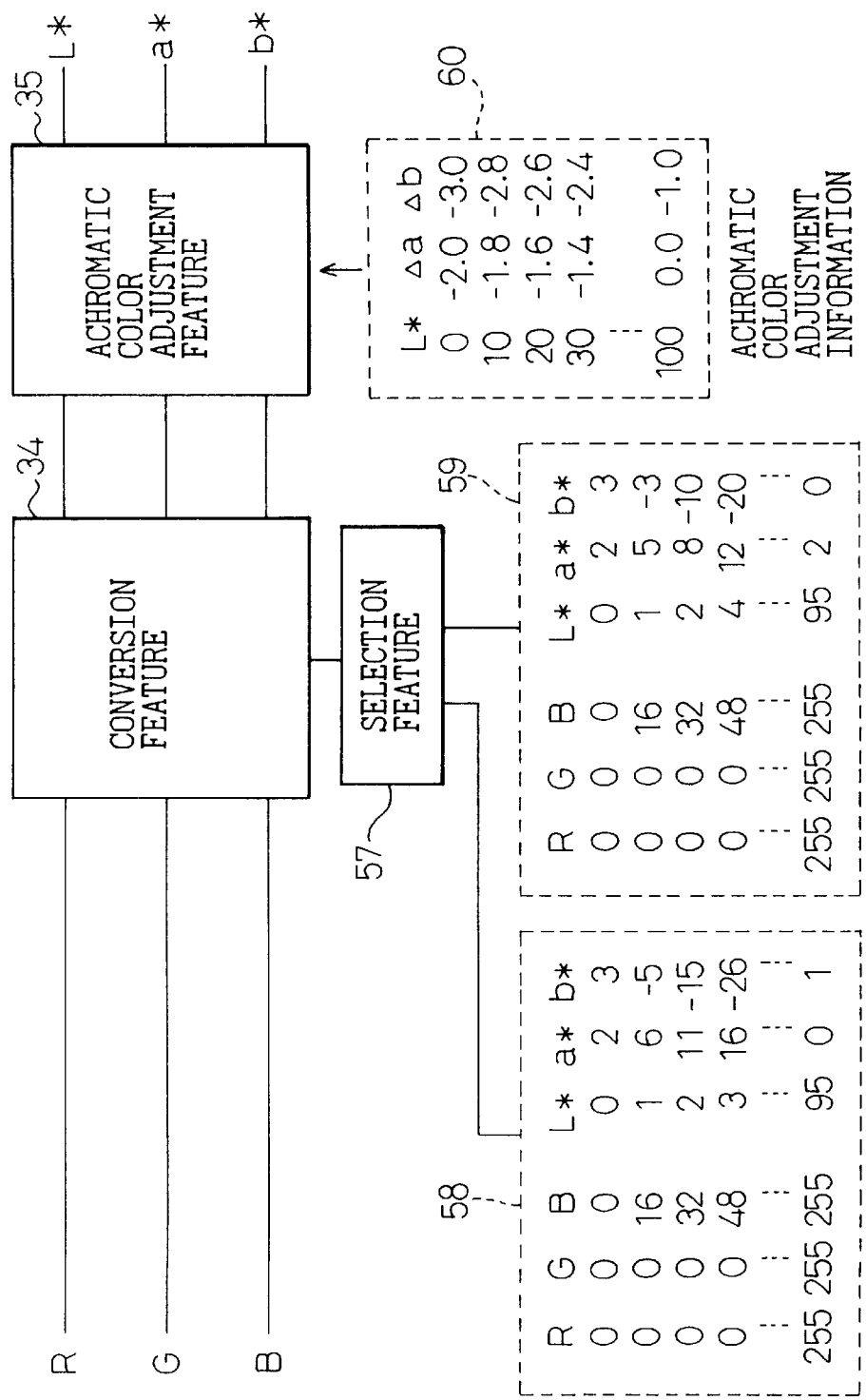

Fig.9A
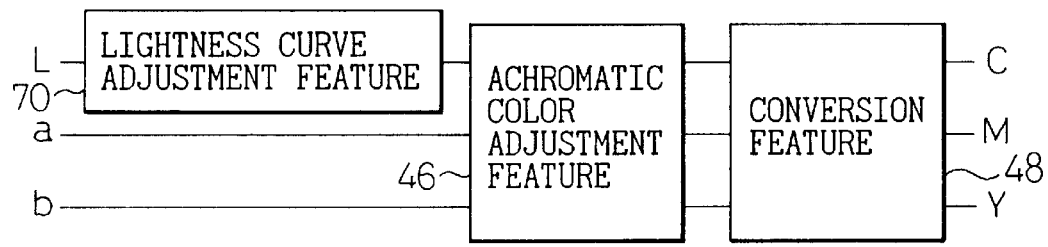
Fig.9B
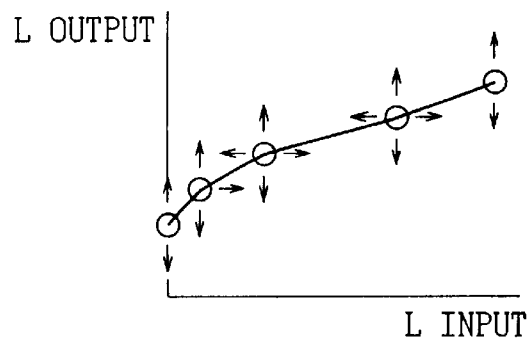
Fig.9C
| L INPUT | L OUTPUT | |
|---|---|---|
| 0 | 20 | |
| 10 | 25 | |
| 30 | 40 | COLOR |
| 70 | 60 | ADJUSTMENT |
| 100 | 80 | INFORMATION |

Fig. 12A
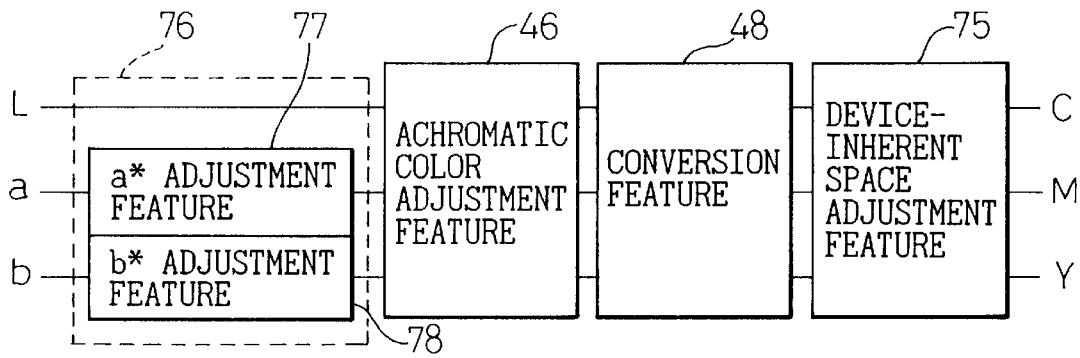
Fig. 12B
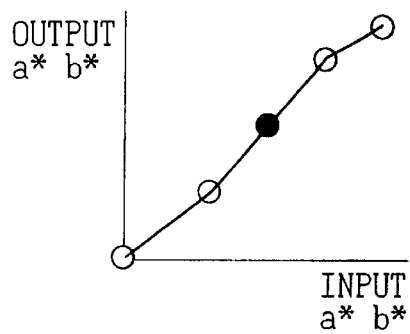
Fig. 12C
| INPUT a* b* | OUTPUT a* b* |
|---|---|
| -120 | -120 |
| -50 | -30 |
| 0 | 0 |
| 50 | 70 |
| 120 | 120 |
COLOR ADJUSTMENT INFORMATION

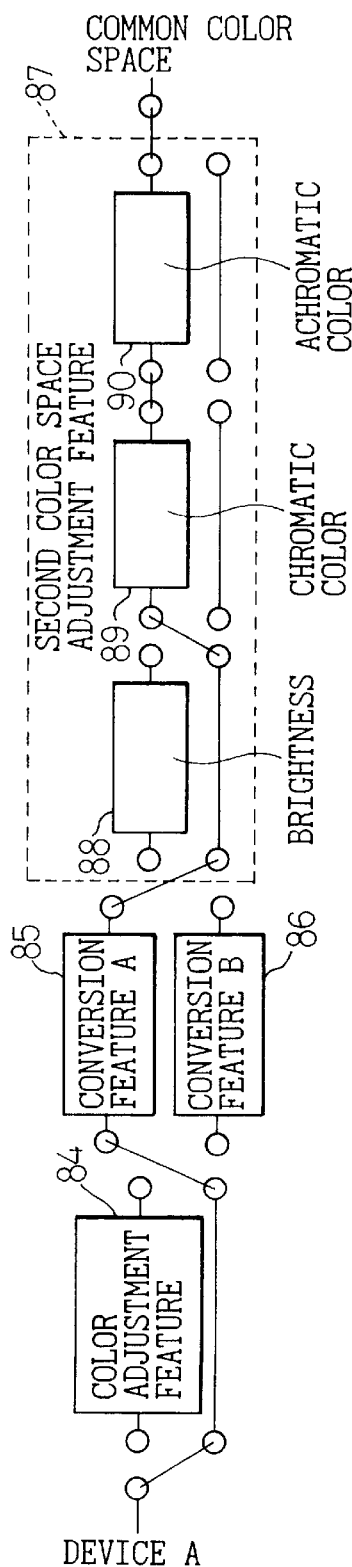

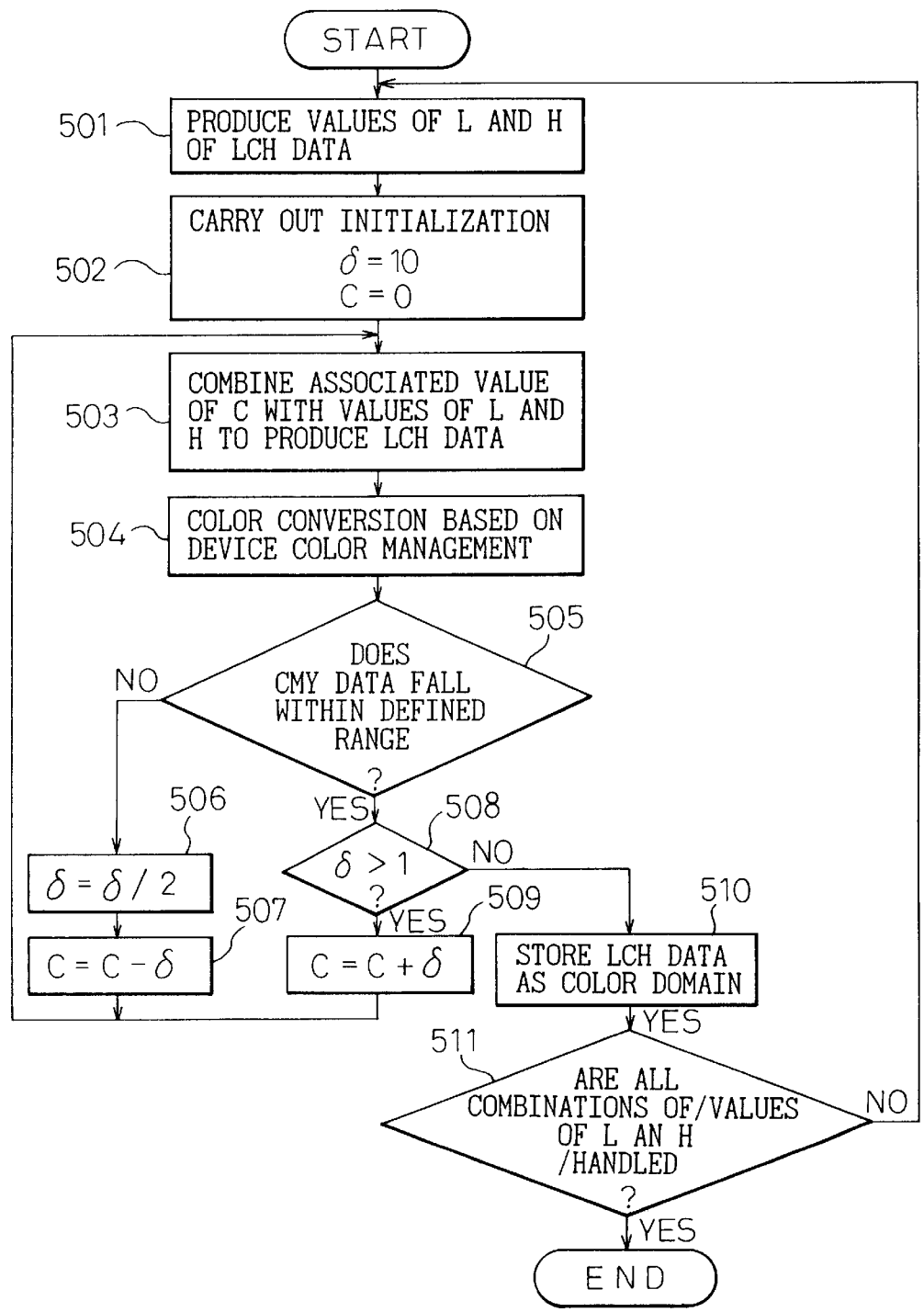

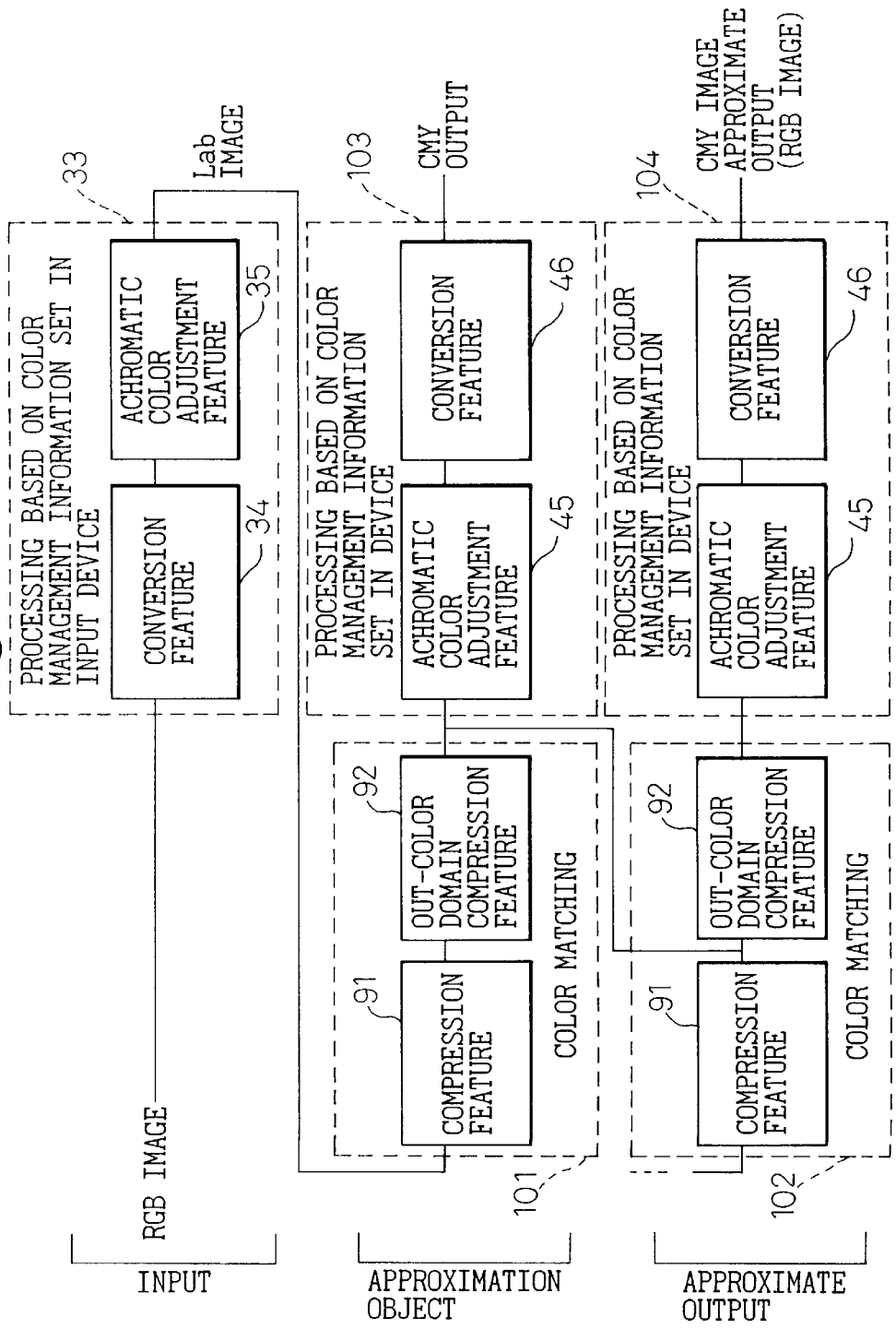

Fig. 22

| DEVICE-INHERENT SPACE ADJUSTMENT INFORMATION | Rg  Gg  Bg<br>1.2  1.1  0.9 |
|---|---|
| CORRESPONDENCE TABLE | R  G  B   L*  a*  b*<br>0  0  0    0   2   0<br>0  0  2    1   1  -1<br>0  0  4    2   1  -2<br>0  0  6    4   1  -2<br>⋮  ⋮  ⋮    ⋮   ⋮   ⋮<br>255 255 255  100  0   6 |
| ACHROMATIC COLOR ADJUSTMENT INFORMATION | L   Δa  Δb<br>0   -2   0<br>100  0   -6 |
| Lab SPACE ADJUSTMENT INFORMATION | Lg<br>1.2 |
| OVERALL CORRESPONDENCE TABLE | R  G  B   L*  a*  b*<br>0  0  0    0   0   0<br>0  0  2    1   1   0<br>0  0  4    2   1  -1<br>0  0  6    4   1  -1<br>⋮  ⋮  ⋮    ⋮   ⋮   ⋮<br>255 255 255  100  0   0 |
| IMAGE DATA | |

COLOR IMAGE INFORMATION PROCESSING SYSTEM, USING COLOR IMAGE INFORMATION TO WHICH ACHROMATIC COLOR INFORMATION IS APPENDED, AND INPUT DEVICE AND OUTPUT DEVICE EMPLOYED IN SAME

BACKGROUND OF THE INVENTION

1. Field of the Invention

The present invention relates to a color image processing system comprising a color image input device such as a scanner, a color image output device such as a display or printer, and a color image processing device, and to the color image input device and color image output device employed in the system. More particularly, this invention is concerned with a color image processing system in which color image information (data) defined in a color space inherent to each device is converted into color image information (data) defined in a common color space so that the color image information can be transferred freely within the system.

2. Description of the Related Art

In a color image processing system, how to reproduce desired colors is very important. A conventional color image processing system is constructed as a closed system comprising, in addition to an image processing device such as a workstation, a dedicated color image input device and color image output device such as a dedicated color scanner, color display, and color printer. This is because a color space used to express color image data to be handled by the color image input device or color image output device is defined, and color image data produced by a certain color image input device cannot be output as it is from another color image output device. Besides, since each device exhibits an inherent characteristic concerning colors, if color image data expressed in the same color space is reproduced as it is, original colors cannot be reproduced. The color image processing system therefore has a conversion feature for converting an input or output of each color image input or output device into suitable color image data. In this case, color image input devices and color image output devices are mutually associated on a one-to-one basis. The conversion feature can be designed so that color image data can be converted into color image data matched with the characteristic of each output device. Thus, color image information produced by a certain system is supposed to be output from the system but not to be used by another system. On the contrary, color image information produced by another system is not supposed to be used by the certain system.

In recent years, an image processing system has been requested to be a multi-vendor system in which color image input and output devices of numerous vendors (or providers of jobs relevant to color image processing) for handling colors are interconnected. Even in the closed system, as long as conversion is carried out, color image information produced by another system can be reproduced. However, it is necessary to optimize color image information for an individual system. This work is time-consuming and needs expertise. The work of color matching is referred to as color management. A system for use in carrying out the work of color matching is referred to as a color management system.

In the case of a multi-vendor system, all vendors do not use color image input and output devices that exhibit specified characteristics. It is requested that all vendors including the vendors, who do not use color image input and output devices that exhibit specified characteristics, can utilize a color image as it is. In this case, it is unknown what characteristic is exhibited by a device used by each vendor for producing or reproducing a color image. An actual color image has therefore been provided together with color image data. Based on the actual color image, the color management work that is time-consuming and needs expertise has been carried out. In the light of the advancement of computing and communications, a multi-vendor system making it possible to utilize color image information produced by a vendor in a remote place or enabling a vendor in a remote place to print produced color image information is feasible. In the case of this system, since an actual color image cannot be provided together, it becomes much harder to reproduce desired colors.

A system in which an output or input of each vendor is converted into color image data independent of a device and transferred has been devised. Color image data independent of a device is represented by associated data of colorimetric values measured under a given environment such as an XYZ space or Lab space. A system in which a conversion feature converts data defined in the XYZ or Lab space into another data is used to make color image data expressed in any of a plurality of color spaces usable may presumably be realized. Each of devices constituting the system includes a conversion feature for converting color image data inherent to the device into color image data expressed in a given color space. In a conventional color management system, information concerning colors handled by a device is managed using a conversion table for simply linking device-inherent data with colorimetric values or using a transformation expression such as a determinant.

In the foregoing color management system, once a colorimeter to be employed is defined, color image data to be transferred between devices should be data expressed in a color space independent of a device and correspond to the same color between the devices. However, when the system is operated actually by a user, there arises a problem that desired colors are not reproduced. Possible causes will be described below.

First, it is impossible for one colorimeter to measure colors handled by all input and output devices. For example, a calorimeter for measuring colors of a print or photograph cannot match colors for a color TV camera. Moreover, when a conversion feature is created by comparing the results of measurement of colors of a color chart by a colorimeter with the output of a color TV camera having imaged the color chart, the results of measurement and output vary depending on the conditions for illuminating the color chart. Moreover, there is a problem that the results of perception of the color chart vary depending on the conditions for illumination and are different from user to user. Another problem is that a print or photograph of the color chart is discolored. Furthermore, in practice, it is very hard for one colorimeter to match colors for all devices. Especially in the system for transferring color image data over a communication line, it is unfeasible for one colorimeter to match colors for all devices. In practice, there is great difficulty in matching colors handled by all devices with the same colorimetric values. Even when color image data expressed in the same color space is employed, colors are different among devices.

Secondly, perception of colors is delicately different from user to user. This depends greatly on an environment such as lighting and the user's psychological factors.

Any conventional system can have a problem that color image data is not provided as desired data or desired colors are not reproduced. In the aforesaid system, a conversion feature in each device is created on the basis of colorimetric values and produced on the assumption that color image data is independent of a device. A user is not supposed to adjust colors. However, in reality, since desired color data is not produced or desired colors are not reproduced, a user of a device adjusts a conversion feature used to convert color image data inherent to a device into color image data expressed in a specified color space, and thus adjusts colors in line with the user's environment or liking. However, the conversion table or determinant that is the conversion feature is used to merely convert color image data inherent to a device into color image data expressed in a given color space. The conversion feature is not created in consideration of human senses. This poses problems that it is very hard to adjust the conversion feature and that expertise and time-consuming work are needed for the adjustment.

SUMMARY OF THE INVENTION

An object of the present invention is to provide a color image processing system making it easy to carry out color management for any device in consideration of user's use environment and liking.

In a color image processing system of the present invention, it is noted that an achromatic color is a color whose perception differs from user to user most markedly and whose reproducibility poses a problem. Information of an achromatic color is appended to color image information produced by a color image information input device, so that what data in the color image information is recognized as data indicating the achromatic color by a user of the color image information input device can be reported to another user. A color image information output device adjusts color image information on the basis of the information concerning an achromatic color so that an achromatic-color portion of the color image information will indicate an achromatic color. Thus, a color image can be reproduced in line with the perception of the user who produced the color image information.

In a system in which color image information is converted into information expressed in a common color space and thus can be transferred among devices, it is reproducibility of an achromatic color that especially poses a problem. In almost all cases, a problem occurs when a color perceived as white or gray by a creator of color image information is output as reddish white or gray or bluish white or gray by another color image output device. A color image processing system in accordance with the present invention appends information of an achromatic color using a first achromatic color information processing feature. Thus, a color perceived as an achromatic color by a creator of color image information is reported to another user. In response to the report, the user reproduces the color image information in line with the creator's perception of an achromatic color. Thus, the aforesaid problems are solved. Needless to say, a user who has produced color image information and a user who reproduces the color image information may be mutually different in terms of perception of an achromatic color. In this case, colors intended by the creator user may not be reproduced. However, it is only a question of a difference in perception between the creator user of color image information and the user who reproduces the color image information. When the present invention is implemented, the fact that the question is a difference in perception between users is clarified. A solution can therefore be sought readily. By contrast, the prior art cannot reveal what is questioned.

A specific color space-to-common color space conversion feature and first achromatic color information processing feature are preferably installed in a color image information input device. A common color space-to-specific color space conversion feature and second achromatic color information processing feature are preferably installed in a color image information output device.

Processing carried out by the first and second achromatic color information processing features is preferably achieved using a color space permitting easy discrimination of a chromatic color from an achromatic color, or more particular, using the uniform color space. In the uniform color space, for example, the Lab space, data whose elements a and b are zeros indicates an achromatic color. When elements a and b are zeroes, an achromatic color is indicated. The first achromatic color information processing feature is therefore designed to be a feature for adjusting color image information representing a color image so that an achromatic-color portion of the color image information will have a value indicating an achromatic color in the uniform color space. The second achromatic color information processing feature is designed to be a feature for adjusting color image information expressed in the uniform color space so that an achromatic-color portion of the color image information having a value indicating an achromatic color will provide the achromatic color. Processing of the features can be set by a user.

Furthermore, in a color image processing system, a color image is processed at various steps. An actual system therefore comprises an input image conversion pre-adjustment feature for adjusting color image information not converted by the inherent color space-to-common color space conversion feature and expressed in a color space inherent to a color image information input device, an input image conversion post-adjustment feature for adjusting color image information adjusted by the first achromatic color adjustment feature and expressed in the uniform color space, an output image conversion pre-adjustment feature for adjusting color image information not adjusted by the second achromatic color adjustment feature and expressed in the uniform color space, and an output image conversion post-adjustment feature for adjusting color image information converted to be expressed in a color space inherent to a color image information output device by means of the common color space-to-inherent color space conversion feature.

An example of the above processing is processing of matching color domains handled by devices. Needed for this kind of processing are a first color domain calculation feature for calculating a first color domain, which is a color domain expressed in a given color space, corresponding to color image information output from the first achromatic color adjustment feature, a second color domain calculation feature for calculating a second color domain, which is a color domain expressed in a second color space, indicating a color capable of being output by the color image information output device, and a first compression feature for compressing color image information according to a given algorithm on the basis of the first color domain and second color domain. Moreover, since a color in a color image may be different from a color indicated by a predicted color domain, it is preferred to include a second compression feature that if a color domain corresponding to color image information compressed by the first compression feature exceeds the second color domain, compresses a portion of the color image information corresponding to the exceeding element of the color domain according to a second given algorithm. The second color domain calculation feature can be implemented by employing an in-range judgment feature for detecting whether or not data obtained by converting color image information by means of a common color space-to-inherent color space conversion feature associated with a color image information output device has a value falling within a defined range. In this case, the first compression feature and second compression feature adjust their magnitudes of compression on the basis of the result of detection performed by the in-range judgment feature. In another configuration, the second color domain calculation feature calculates a second color domain on the basis of a domain in the uniform color space, which is defined by inversely converting an output of the common color space-to-inherent color space conversion feature for converting an input of a color image information output device. In yet another configuration, the second color domain calculation feature includes a color domain setting feature enabling a user to arbitrarily set a second color domain, and outputs the second color domain set using the color domain setting feature.

Furthermore, the first compression feature includes a lightness domain calculation feature for calculating a first lightness domain defined by a maximum level and minimum level of lightness serving as an element of the first color domain, and a second lightness domain defined with a maximum level and minimum level of lightness serving as an element of the second color domain, and a lightness conversion feature for converting color image information so that the first and second lightness domains will agree with each other. If a color image information output device is a device for outputting an image on paper, the lightness domain calculation feature specifies the level of lightness of the paper as the maximum level of lightness serving as an element of the second color domain. In another configuration, the first compression feature includes a chroma conversion feature for converting color image information so that a maximum level of chroma relative to each level of hue serving as an element of the first color domain will agree with a maximum level of chroma relative to each level of hue serving as an element of the second color domain.

If a plurality of color image output devices exhibit similar characteristics, data adjusted within a certain device can be used to provide an approximate output from another device. In this case, when one of two or more color image information output devices is used to output color image information, color image information compressed by first and second compression features associated with a color image information output device exhibiting a similar characteristic is input to a second compression feature associated with the one color image information output device. Otherwise, color image information compressed by the first and second compression features is further adjusted by a second achromatic color adjustment feature and then input to the second compression feature associated with the one color image information output device. In this case, the second compression feature changes a portion of color image information representing a color image and being compressed by the second compression feature, of which the width is equal to or larger than a given value, into a given value.

Furthermore, the inherent color space-to-common color space conversion feature and first achromatic color information adjustment feature in a color image information input device are mutually independent and need therefore to be adjusted independently. Once the features are adjusted, the conversions should preferably be carried out simultaneously. From this viewpoint, it is preferred to include a simultaneous conversion feature having the capabilities of the inherent color space-to-common color space conversion feature and first achromatic color information adjustment feature, and a selection feature for selecting whether or not the simultaneous conversion feature should be operated. For outputting color image information converted by the simultaneous conversion feature, preferably, information provided by the inherent color space-to-common color space conversion feature and first achromatic color information adjustment feature should be appended to the color image information. Thus, how the adjustment has been carried out, can be reported accurately.

A color information input device employed in the system is a color image information input device for producing color image information defined in a given color space, and includes an inherent color space-to-common color space conversion feature for converting color image information expressed in an inherent color space into color image information expressed in the given color space, and an achromatic color information processing feature for appending achromatic color information to the color image information converted to be expressed in the given color space by the inherent color space-to-common color space conversion feature.

As mentioned above, the given color space should preferably be the uniform color space. The achromatic color information processing feature is a feature for adjusting color image information representing a color image so that an achromatic-color portion of the color image information will have a value indicating an achromatic color in the uniform color space. For implementing the achromatic color adjustment feature, magnitudes of correction of levels of hue and chroma relative to any input levels of lightness are used to interpolate magnitudes of correction of levels of hue and chroma relative to any level of lightness. The calculated magnitudes of correction of levels of hue and chroma relative to each level of lightness are appended to color image information expressed in the uniform color space.

In the inherent color space-to-common color space conversion feature, preferably, a plurality of conversion methods for converting an inherent color space to a given color space are set, and any of the conversion methods can be selected. Further included are, preferably, an input image conversion pre-adjustment feature for adjusting color image information not converted by the inherent color space-to-common color space conversion feature and expressed in the color space inherent to the color image information input device, and an input image conversion post-adjustment feature for adjusting color image information adjusted by the first achromatic color adjustment feature and expressed in the uniform color space. The input image conversion post-adjustment feature can be implemented by employing a lightness conversion feature for arbitrarily changing an output level of lightness expressed in the uniform color space in relation to an input level thereof, an adjustment feature for adjusting the levels of lightness, hue, and chroma of any color, and an interpolation feature for interpolating an intermediate color using any colors adjusted by the adjustment feature according to a given algorithm, or by employing a feature for arbitrarily changing a curve plotted using values of perceptive attributes of hue and chroma expressed in the uniform color space. Furthermore, the input image conversion post-adjustment feature includes a plurality of different adjustment features, and a selection feature for selecting and combining any of the plurality of different adjustment features.

Preferably, a simultaneous conversion feature having the capabilities of both the inherent color space-to-common color space conversion feature and first achromatic color information adjustment feature, and a selection feature for selecting whether or not the simultaneous conversion feature should be operated are included. Information provided by the inherent color space-to-common color space conversion feature and first achromatic color information adjustment feature should preferably be appended to color image information converted by the simultaneous conversion feature.

Furthermore, a color image output device employed in the system is a color image information output device for producing a color image on the basis of color image information having achromatic color information appended thereto and expressed in a given color space. The color image information output device comprises a common color space-to-inherent color space conversion feature for converting color image information expressed in the given color space into color image information expressed in a color space inherent to the color image information output device, and an achromatic color information processing feature for adjusting color image information to be converted by the common color space-to-inherent color space conversion feature and expressed in the given color space according to the achromatic color information so that the achromatic-color portion of the color image information will represent an achromatic color in a produced color image.

The given color space is preferably the uniform color space. In this case, the achromatic color information processing feature is an achromatic color adjustment feature for adjusting the color image information expressed in the uniform color space so that a portion of the color image information having a value indicating an achromatic color will represent the achromatic color. The achromatic color adjustment feature uses magnitudes of correction of levels of hue and chroma relative to any input levels of lightness to interpolate magnitudes of correction of levels of hue and chroma relative to each level of lightness, and appends the calculated magnitudes of correction of levels of hue and chroma relative to each level of lightness to the color image information expressed in the uniform color space. In the common color space-to-inherent color space conversion feature, preferably, a plurality of conversion methods for converting an inherent color space into a given color space are set and any of the conversion methods can be selected for use.

Further included are an output image conversion pre-adjustment feature for adjusting color image information not adjusted by the achromatic color adjustment feature and expressed in the uniform color space, and an output image conversion post-adjustment feature for adjusting color image information converted by the common color space-to-inherent color space conversion feature and expressed in the color space inherent to the color image information output device. The output image conversion pre-adjustment feature includes a lightness conversion feature for arbitrarily changing an output level of lightness expressed in the uniform color space in relation to an input level thereof, or includes an adjustment feature for adjusting the levels of lightness, hue, and chroma of any color, and an interpolation feature for interpolating an intermediate color using any colors adjusted by the adjustment feature according to a given algorithm, or includes a feature for arbitrarily changing a curve plotted using values of perceptive attributes of hue and chroma expressed in the uniform color space.

BRIEF DESCRIPTION OF THE DRAWINGS

The present invention will be more clearly understood from the description as set below with reference to the accompanying drawings, wherein:

FIG. 5 is a diagram showing an RGB data-to-Lab data conversion table set in a conversion unit in the first embodiment;

FIG. 6A is a diagram showing the configuration of an achromatic color adjustment unit in the first embodiment;

FIG. 6B is a diagram showing processing of the achromatic color adjustment unit in the first embodiment;

FIG. 6C is a diagram showing a conversion table set in the achromatic color adjustment unit in the first embodiment;

FIG. 7 is a diagram showing a conversion unit in the second embodiment;

FIG. 9A is a diagram showing the configuration of an adjustment/conversion unit in the fourth embodiment;

FIG. 9B is a diagram showing processing performed by the adjustment/conversion unit in the fourth embodiment;

FIG. 9C is a diagram showing a conversion table set in the adjustment/conversion unit in the fourth embodiment;

FIG. 12A is a diagram showing the configuration of an adjustment/conversion unit in the sixth embodiment;

FIG. 12B is a diagram showing processing of the adjustment/conversion unit in the sixth embodiment;

FIG. 12C is a diagram showing a conversion table set in the adjustment/conversion unit in the sixth embodiment;

FIG. 13A is a diagram showing the configuration of a conversion/adjustment unit in the seventh embodiment;

FIG. 13B is a diagram describing processing of the conversion/adjustment unit in the seventh embodiment;

FIG. 15 is a flowchart describing a procedure of color domain calculation in the eight embodiment;

FIG. 19 is a diagram showing the configuration of a processing system in the twelfth embodiment;

FIG. 22 is a diagram showing the structure of image information in the fourteenth embodiment.

DESCRIPTION OF THE PREFERRED EMBODIMENTS

Before proceeding to a detailed description of the preferred embodiments of the present invention, a prior art color image processing system will be described to allow a better understanding of the differences between the present invention and the prior art.

Figure 1:
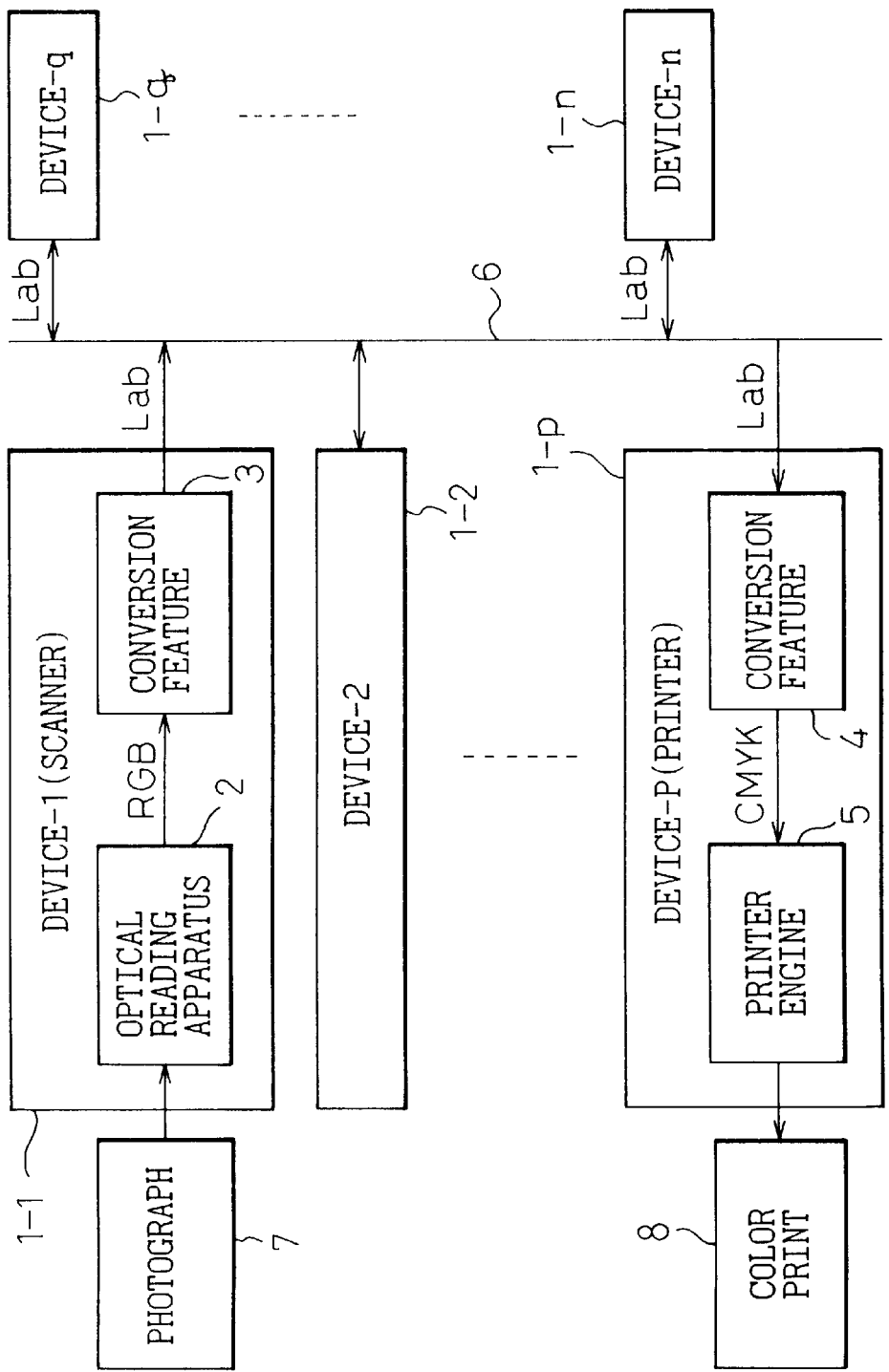
FIG. 1 is a diagram showing the configuration of a color image processing system in accordance with a prior art.

FIG. 1 is a diagram showing the configuration of a conventional system in which an output or input of each vendor is transferred in the form of color image data independent of a device. When serving as an input device, each of devices 1-1, 1-p, 1-q, and 1-n outputs color image data expressed in the Lab space. When serving as an output device, each of the devices receives color image data expressed in the Lab space and reproduces an image. It is also conceivable that a system enabling use of color image data expressed in a plurality of color spaces is realized by employing a conversion feature for converting the XYZ space into the Lab space or vice versa. Each device includes a conversion feature for converting color image data inherent to the device into color image data expressed in a given color space. For example, the device 1-1 in FIG. 1 is a scanner. A reader 2 outputs color image data in the form of RGB data. The device 1-1 includes a conversion feature 3 for converting the RGB data into Lab data. The conversion feature 3 is provided as a conversion table or a transformation expression such as a determinant. A test pattern whose data has been measured by a given calorimeter in advance is read by the reader 2. A conversion table or transformation expression is created on the basis of RGB data items output from the reader 2 and the results of measurement performed by the calorimeter. The device 1-p in FIG. 1 is a color printer. A printer engine 5 receives cyan, magenta, yellow, and black data items (CMYK data) and outputs a color image. The device 1-p includes a conversion feature 4 that is a conversion table or transformation expression used to convert Lab data into CMYK data. The conversion table or transformation expression of the conversion feature 4 is defined by associating the CMYK data items with the results of measurement of an output test pattern by a given colorimeter. Thus, in the conventional color management system, information of colors handled by a device is managed using a conversion table for merely linking data items provided by the device with colorimetric values or a transformation expression such as a determinant.

In the conventional system, a conversion feature in each device is created on the basis of colorimetric values on the assumption that color image data is independent of a device. A user is not supposed to adjust color image data. However, in reality, if color data does not represent a desired color or a desired color is not reproduced, a user of each device adjusts a conversion feature used to convert color image data inherent to the device into color image data expressed in a given color space, and thus matches colors with the user's environment or liking. However, a conversion table or determinant that is a conversion feature is used to convert color image data inherent to a device into color image data expressed in a given color space. The conversion does not take account of human senses. The adjustment is therefore very hard to do.

Before mention is made of preferred embodiments of the present invention, the basic configuration of a color image processing system in accordance with the present invention will be described.

Figure 2:
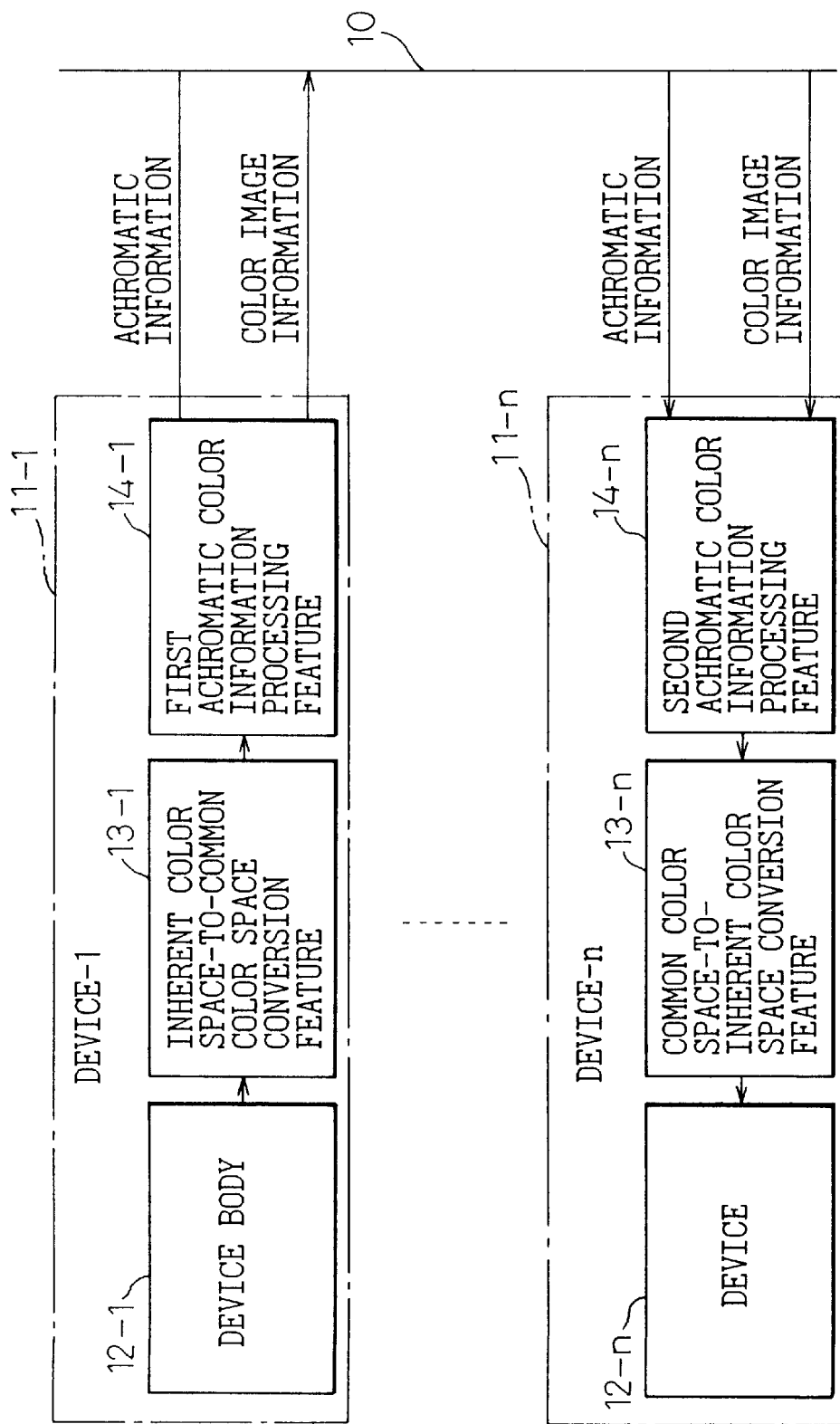
FIG. 2 is a diagram showing the basic configuration of a color image processing system in accordance with the present invention.

FIG. 2 is a diagram showing the basic configuration of a color image processing system in accordance with the present invention.

As illustrated, the color image processing system in accordance with the present invention comprises at least one color image information input device 11-1 for producing color image information, and at least one color image information output device 11-n for producing a color image on the basis of the color image information. The color image processing system further comprises an inherent color space-to-common color space conversion feature 13-1 for converting color image information, which is produced by the color image information input device 11-1 and expressed in a color space inherent to the color image information input device, into color image information expressed in a given color space, and a common color space-to-inherent color space conversion feature 13-n for converting color image information expressed in the given color space into color image information expressed in a color space inherent to the color image information output device. Color image information is converted into information expressed in a common color space, and can thus be transferred between each color image information input device and each color image information output device. The color image information processing system further comprises a first achromatic color information processing feature 14-1 for adjusting color image information converted to be expressed in the given color space by means of the inherent color space-to-common color space conversion feature 13-1 so that an achromatic-color portion of the color image information will have a value indicating an achromatic color in the given color space, and a second achromatic color information processing feature 14-n for adjusting color image information to be converted by the common color space-to-inherent color space conversion feature 13-n and expressed in the given color space so that a portion of the color image information indicating an achromatic color will represent the achromatic color.

In the color image processing system of the present invention, the first achromatic color information processing feature 14-1 is included for appending information of an achromatic color. A color perceived as an achromatic color by a creator of color image information can therefore be reported to another user. In response to the report, another user reproduces the color image information in line with the creator's perception of the achromatic color.

Figure 3:
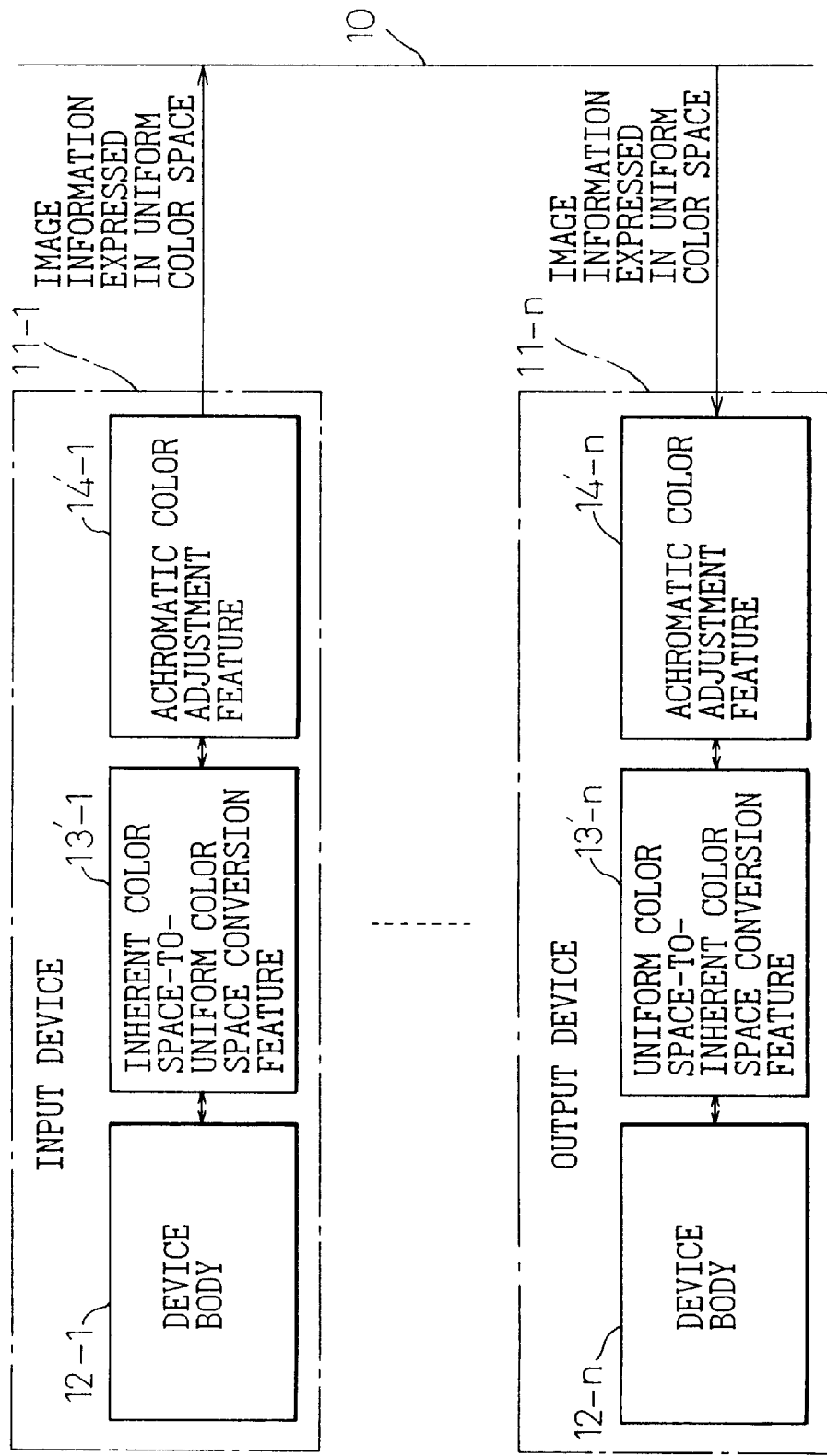
FIG. 3 is a diagram showing the basic configuration of a color image processing system in accordance with the present invention in which data expressed in the uniform color space is transferred, and a color thought as an achromatic color by a user of each device is associated with a value indicating an achromatic color in the uniform color space.

Processing of the first and second achromatic color information processing features 14-1 and 14-n is preferably achieved using a color space permitting easy discrimination of a chromatic color from an achromatic color, or more particularly, using the uniform color space. FIG. 3 is a diagram showing the basic system configuration of the present invention in which a given color space is the uniform color space. The inherent color space-to-common color space conversion feature 13-1 converts data expressed in a color space inherent to a device into data expressed in the uniform color space. The common color space-to-inherent color space conversion feature 13-n converts data expressed in the uniform color space into data expressed in a color space inherent to a device.

Figure 4:
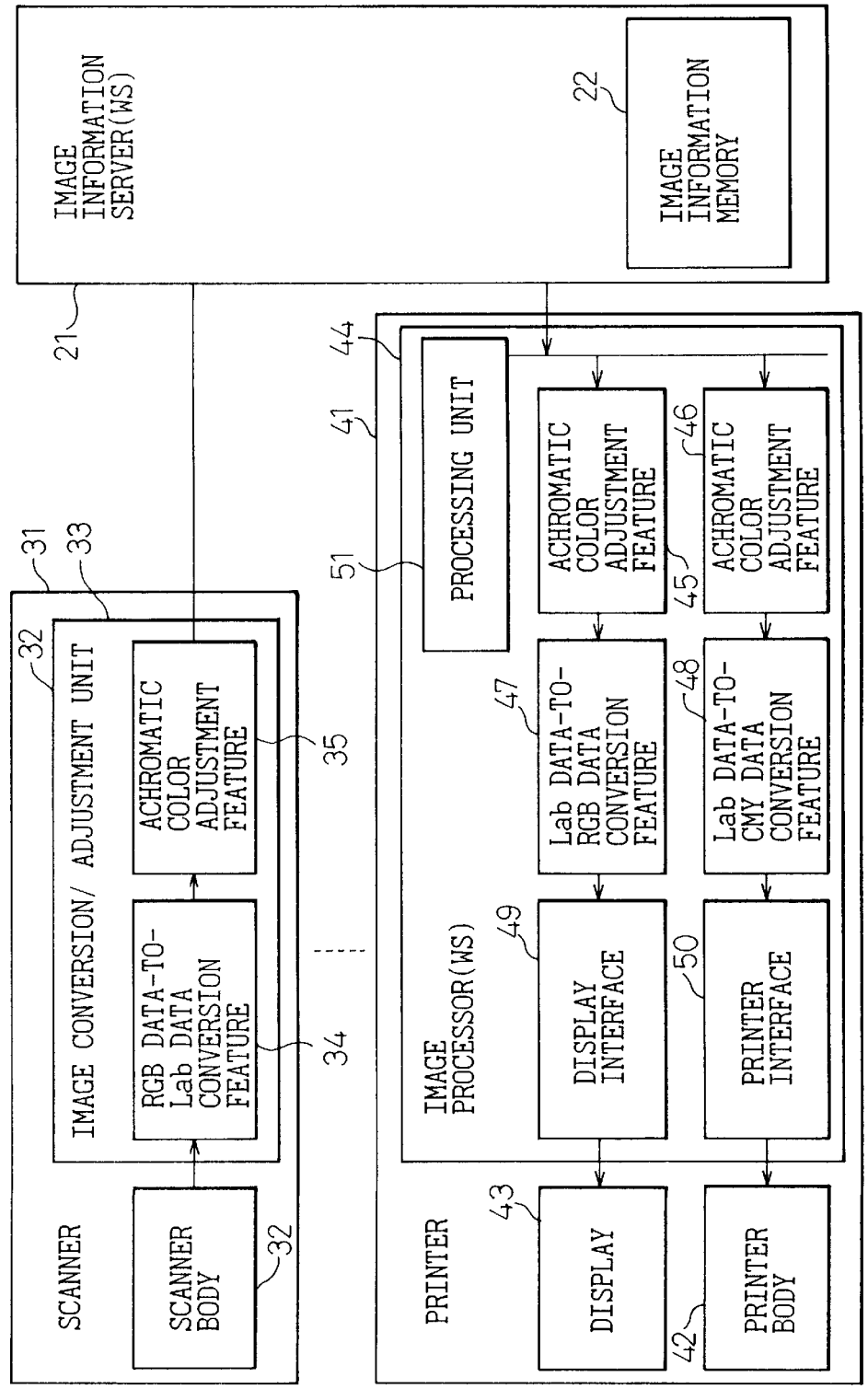
FIG. 4 is a diagram showing the overall configuration of a color image processing system in accordance with the first embodiment of the present invention.

FIG. 4 is a diagram showing the overall configuration of a color image processing system in accordance with the first embodiment of the present invention. As illustrated, in the system, various kinds of devices are connected to an image information server 21. Color image information (data) produced by a color image information input device is temporarily stored in an image information memory in the server 21. Requested data is output from the image information memory in response to a request issued from a color image information output device. The image information server 21 is realized with, for example, a workstation (WS) and includes various image processing software packages. In FIG. 4, a scanner 31 is shown as the color image information input device, and a printer 41 is shown as the color image information output device. Aside from the devices, numerous input devices, output devices, and image processing devices are connected over communication lines or connected directly over cables. In an image processing device, data supplied from the server 21 is output temporarily to a display. While viewing an image on the display, a user carries out various kinds of processing so as to produce a new color image, and sends the image data to the server 21. The image processing device and its display therefore operate as either a color image input device or color image output device. Hereinafter, a description will proceed by taking the illustrated scanner 31 and printer 41 as examples of the color image input device and color image output device respectively.

The scanner 31 comprises a scanner body 32 and an image conversion/adjustment unit 33. The scanner body 32 is identical to a conventional color scanner. Herein, the scanner body 32 outputs image data in the form of RGB data. The image conversion/adjustment unit 33 is realized with a personal computer or workstation, or realized as a dedicated data processing device, and includes an RGB data-to-Lab data conversion feature 34 for converting RGB data output from the scanner body 32 into Lab data, and an achromatic color adjustment feature 35 for adjusting the Lab data output from the RGB data-to-Lab data conversion feature. The RGB data-to-Lab data conversion feature 34 and achromatic color adjustment feature 35 are realized with software or may be realized with dedicated circuits.

The printer 41 comprises a printer body 42, an image processor 44 realized with a workstation, and a color display used to proceed with processing by the image processor 44. The image processor 44 includes a processing unit 51 designed to process data expressed in the Lab space, an achromatic color adjustment feature 45 for displaying data produced by the processing unit 51 on the display 43, a Lab data-to-RGB data conversion feature 47, a display interface 49, an achromatic color adjustment feature 46 for outputting data to be printed by the printer body 42, a Lab data-to-CMY data conversion feature 48, and a printer interface 50. Data output from the server 21 is sent to the processing unit 51.

The constituent features of the present invention lie in the achromatic color adjustment feature and relevant conversion feature. The description of the other components will therefore be omitted.

FIG. 5 is a diagram showing an example of the structure of an RGB data-to-Lab data conversion table 34 forming the RGB data-to-Lab data conversion feature 34. When RGB data is input, the RGB data-to-Lab data conversion feature searches for associated Lab data in the table and outputs the Lab data. Herein, the table is a table containing Lab data items associated with RGB data items varied in units of 16 levels. According to RGB data, associated Lab data is calculated. As for intermediate RGB data not listed in the table, it is interpolated using adjacent data items listed in the table. An example of the structure of the RGB data-to-Lab data conversion table 34 in the scanner 31 has been presented. A similar table can be created as the Lab data-to-RGB data conversion feature 47 for the display 43 or the Lab data-to-CMY data conversion feature for the printer 42. Moreover, a determinant may be substituted for the conversion table. In any case, the conversion table or determinant is created in advance using colorimetric values provided by a colorimeter.

FIG. 6A is a diagram showing the configuration of the achromatic color adjustment feature 35, 45, or 46 in the first embodiment, FIG. 6B is a diagram showing an example of the contents of processing, and FIG. 6C is a diagram showing an example of a conversion table employed in the feature. As shown in FIG. 6A, the achromatic color adjustment feature consists of an a adjustment value calculation feature 52, a b adjustment value calculation feature 53, an adder 54 for adding a magnitude of adjustment of element a to data, and an adder 55 for adding a magnitude of adjustment of element b to data. The a adjustment value calculation feature 52 and b adjustment value calculation feature 53 can set, as indicated with reference numerals 52' and 53', a magnitude of adjustment in relation to the levels of lightness L that are 0, 100, or an intermediate value (55 for element a and 45 for element b). For example, a display like the one shown in FIG. 6B appears on the display, and a user manipulates a mouse or the like to designate a proper magnitude of adjustment in relation to three points of the lightness levels. The a adjustment value calculation feature 52 and b adjustment value calculation feature 53 calculate magnitudes of adjustment of elements a and b according to the level of lightness L for each data on the basis of the designated magnitudes of adjustment. The adders 54 and 55 add the magnitudes of adjustment to data. Herein, elements a and b are adjusted in relation to the three points of the levels of lightness L. Alternatively, the elements may be adjusted in relation to a larger number of lightness levels.

A typical calculation procedure for calculating a magnitude of adjustment in relation to each lightness level on the basis of the designated values of elements a and b relative to lightness levels. For example, assume that adjustment values are designated in relation to M levels of lightness L, the adjustment values for element a, $\Delta a$, relative to lightness levels L1, L2, etc., and LM are $\Delta a1$, $\Delta a2$, etc., and $\Delta aM$. Assume that adjustment values are designated in relation to N levels of lightness L, the adjustment values for element b, $\Delta b$, relative to lightness levels L1, L2, etc., and LN are $\Delta b1$, Δb2, etc., and ΔbN. Adjusted color elements L', a', and b' are expressed as follows:

$$L' = L$$

$$a' = a + \sum_{i=0}^{M} Fi(L)\Delta ai$$

$$b' = b + \sum_{i=0}^{N} Fi(L)\Delta bi$$

wherein $$Fi(L) = \frac{(L-L1)(L-L2)...(L-LM)}{(Li-L0)(Li-L1)...(Li-LM)}$$

or $$Fi(L) = \frac{(L-L1)(L-L2)...(L-LN)}{(Li-L0)(Li-L1)...(Li-LN)}$$

For adjustment, in the case of, for example, a scanner, an image is read. Lab data converted using the RGB data-to-Lab data conversion table 34, and representing a portion of the image which a user thinks should be displayed in achromatic color, is checked. At this time, if elements a and b of the Lab data are zeros, nothing will be done. If either of elements a and b is not zero, a magnitude of adjustment provided by the a adjustment value calculation feature 52 or b adjustment value calculation feature 53 is changed so that both the elements will have zeroes. In the case of a printer, the magnitudes of adjustment set by the a adjustment value calculation feature 52 and b adjustment value calculation feature 53 are changed so that an image portion represented by Lab data whose elements a and b are zeroes will be displayed in achromatic color. The magnitudes of adjustment to be set by the a adjustment value calculation feature 52 and b adjustment value calculation feature 53 can be set mutually independently. This means that the achromatic color adjustment feature includes a conversion table like the one shown in FIG. 6C.

When data is expressed in the Lab space, an achromatic color is defined as data whose elements a and b are zeroes. Adjustment can therefore be achieved by changing elements a and b a little, and is easy to do. In this embodiment, elements a and b can be adjusted in relation to each level of lightness L. Consequently, precise adjustment can be achieved.

FIG. 7 is a diagram showing the configuration of a conversion feature in the second embodiment. This embodiment is different from the first embodiment in terms of the RGB data-to-Lab data conversion feature 34 in the scanner 31. The other components are identical to those in the first embodiment. The color space inherent to a device is the RGB color space, and the common color space is the Lab color space. As illustrated, in the second embodiment, the conversion feature includes a plurality of conversion tables 58 and 59 either of which can be selected by a selection feature 57. A plurality of conversion tables are included because the plurality of environmental conditions is conceivable for the device and are changed every time the device is operated. The configuration adopted in the second embodiment, that is, the configuration in which the conversion feature includes a plurality of conversion tables that are selectively usable is adaptable to another device. For example, the same configuration can be adapted to the Lab data-to-RGB data conversion feature 47 for the display or the Lab data-to-CMY data conversion feature for the printer in the first embodiment.

Figure 8:
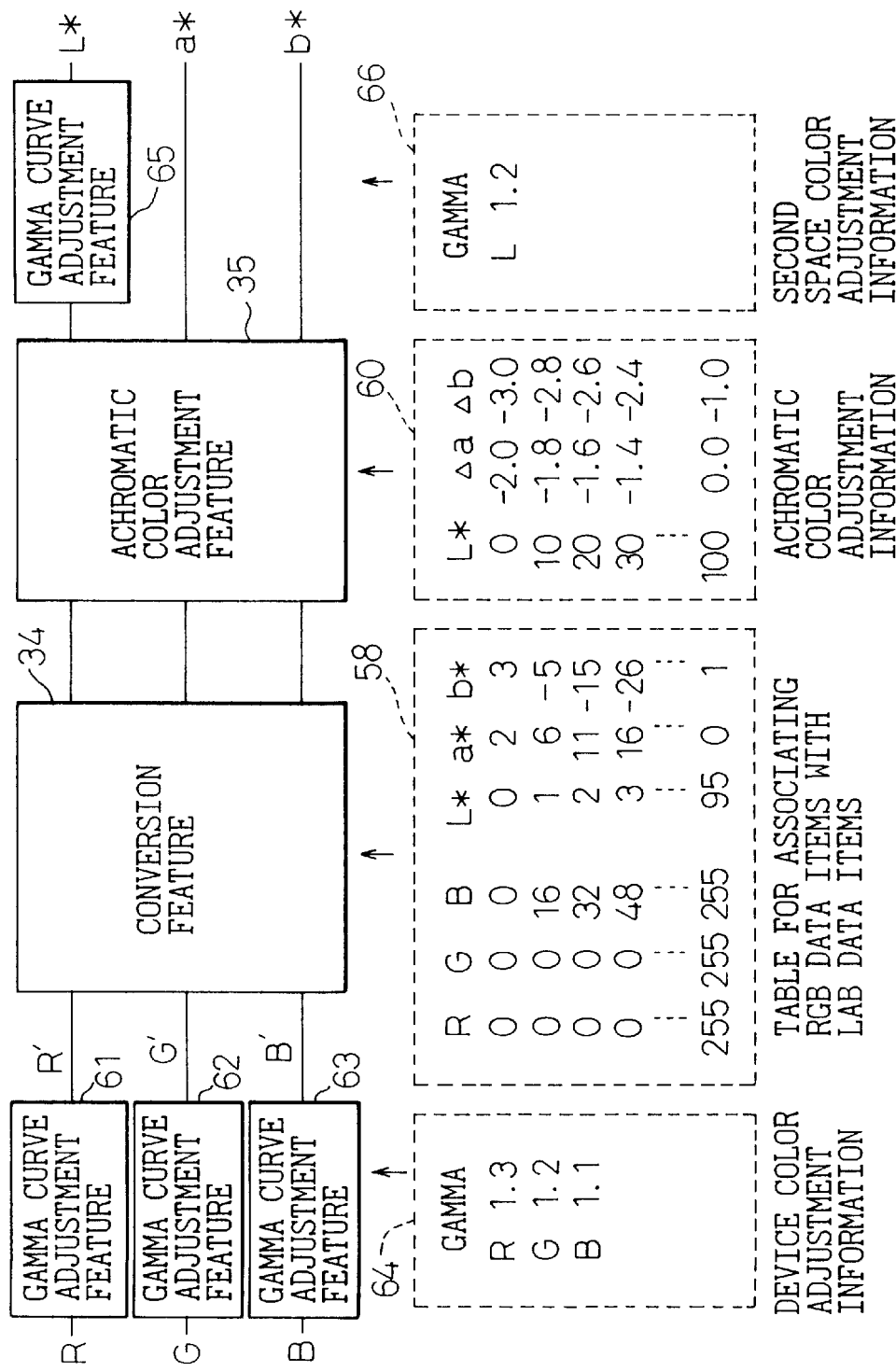
FIG. 8 is a diagram showing the configuration of an image conversion/adjustment unit in the third embodiment.

FIG. 8 is a diagram showing the configuration of an image conversion/adjustment unit 32 in the third embodiment. This embodiment is different from the first embodiment in terms of the image conversion/adjustment unit in the scanner 31. The other components are identical to those in the first embodiment. The color space inherent to a device is the RGB color space, and the common color space is the Lab color space. In the third embodiment, the conversion feature 34 is preceded by gamma curve adjustment features 61 to 63 for changing characteristic curves of gammas of red, green, and blue expressed in the color space inherent to the device, and the achromatic color adjustment feature 35 is succeeded by a gamma curve adjustment feature 65 for adjusting a gamma curve relative to lightness L. Assuming that gammas of red, green, and blue are Rg, Gg, and Bg, the gamma curve adjustment features 61 to 63 convert RGB data input from a device body according to the expressions below so as to calculate elements R', G', and B'.

$$R'=R^{1/Rg}$$

$$G'=G^{1/Gg}$$

$$B'=B^{1/Bg}$$

The configuration employed in the third embodiment, that is, the configuration in which a feature for adjusting data in a color space inherent to a device is included in preceding and succeeding stages of a conversion feature and an achromatic color adjustment feature, is adaptable to another device. For example, a similar configuration can be adapted to the pair of the achromatic color adjustment feature 45 and Lab data-to-RGB data conversion feature 47 for the display or to the pair of the achromatic color adjustment feature 46 and Lab data-to-CMY data conversion feature for the printer. In the case of the Lab data-to-RGB data conversion feature 47, the feature 47 inputs data to the gamma curve adjustment features 61 to 63. In this case, assuming that inputs are elements R', G', and B', the elements are converted according to the expressions below in order to calculate RGB data.

$$R=R'^{Rg}$$

$$G=G'^{Gg}$$

$$B=B'^{Bg}$$

FIG. 9A shows the configuration of the portion including the achromatic color adjustment feature 46 and conversion feature 48 in the fourth embodiment, FIG. 9B shows the contents of processing, and FIG. 9C shows a conversion table employed. This embodiment is different from the first embodiment in terms of the achromatic color adjustment feature 46 and Lab data-to-CMY data conversion feature 48 for the printer. The other components are identical to those in the first embodiment. The common color space is therefore the Lab space, and the color space inherent to a device is the CMY color space. In the fourth embodiment, the achromatic color conversion feature 46 is preceded by a lightness curve adjustment feature 70. The lightness curve adjustment feature 70 graphically displays, as shown in FIG. 9B, the relationship between an input level of lightness L and an output level thereof. A user uses a mouse or the like to adjust the curve. An adjusted curve is stored in the form of, for example, a lightness curve adjustment table such as the one shown in FIG. 9C. An output is adjusted according to an input. In the example shown in FIG. 9C, a range of lightness levels is reduced to 60%. The configuration employed in the fourth embodiment, that is, the configuration in which adjustment is carried out in a common color space is also adaptable to a feature associated with another device. For example, the same feature (whose output is RGB data) can be adapted to a feature associated with a display. Moreover, the lightness curve adjustment feature in this embodiment can be substituted for the gamma curve adjustment feature 65 in the third embodiment.

Figure 10A:
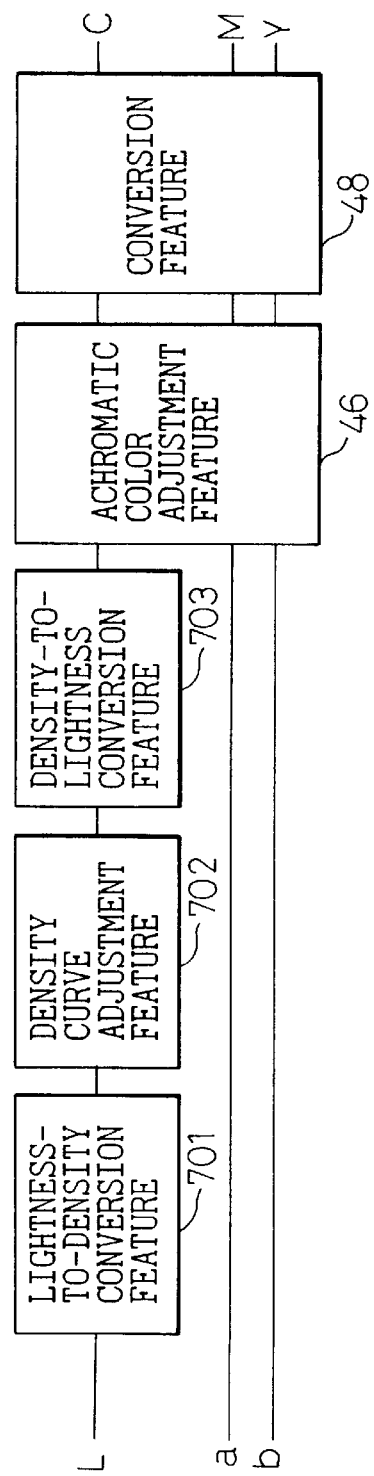
FIG. 10A is a diagram showing the configuration of an adjustment/conversion unit in a variant of the fourth embodiment.
Figure 10B:
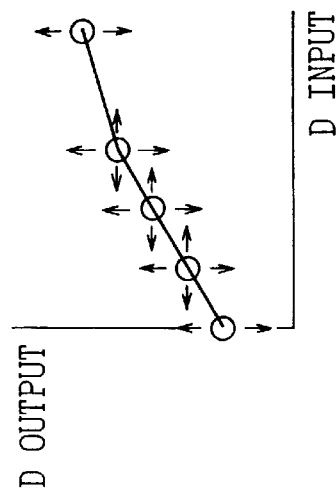
FIG. 10B is a diagram showing processing of the adjustment/conversion unit in the variant of the fourth embodiment.

For printing, when colors are indicated with density levels but not with lightness levels, the colors get closer to colors perceived actually. In this case, adjustment can be achieved more easily by employing data representing colors closer to the colors perceived actually. FIGS. 10A and 10B show the configuration and processing of the portion including the achromatic color adjustment feature 46 and conversion feature 48 in a variant of the fourth embodiment in which colors can be adjusted on the basis of density levels. As shown in FIG. 10A, also included are a lightness-to-density conversion feature 701 for converting a level of lightness L into a level of density, a density curve adjustment feature 702, and a density-to-lightness conversion feature 703. Adjustment is, similarly to that in the fourth embodiment, such that the relationship between an input level and output level of density D is, as shown in FIG. 10B, displayed graphically and a user uses a mouse or the like to adjust the curve.

A transformation expression of the lightness-to-density conversion feature 701 is given below.

$L=116 \times (10^{-D})^{1/3} - 16$  ($10^{-D} > 0.008856$)

$L=116 \times (7.787 \ddagger (10^{-D} + {}^{16}/_{116})) - 16$  ($10^{-D} \leq 0.008856$)

A transformation expression of the density-to-lightness conversion feature 703 is inverse to the above expression.

Figure 11A:
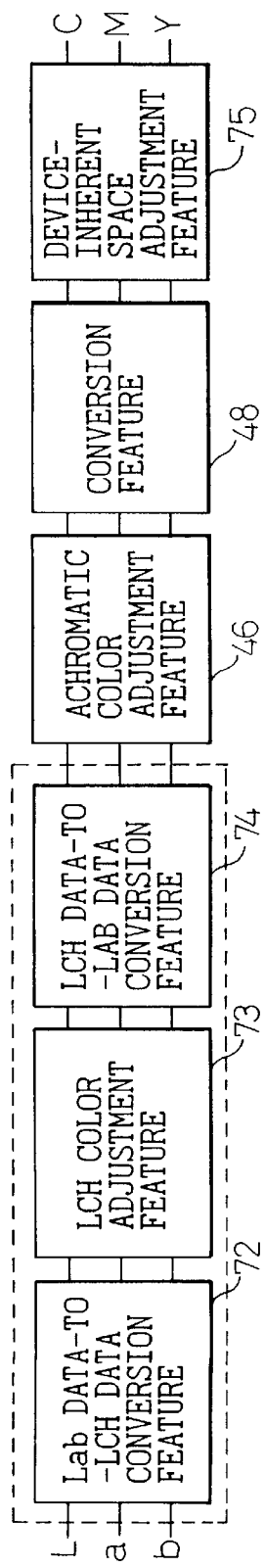
FIG. 11A is a diagram showing the configuration of an adjustment/conversion unit in the fifth embodiment.
Figure 11B:
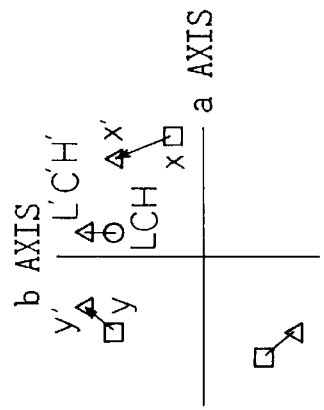
FIG. 11B is a diagram showing processing of the adjustment/conversion unit in the fifth embodiment.
Figure 11C:
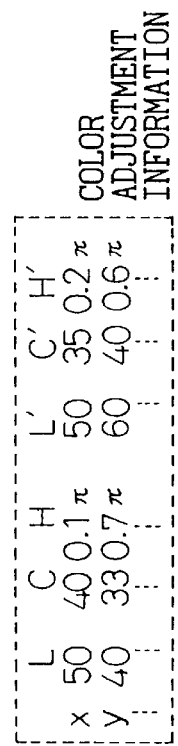
FIG. 11C is a diagram showing a conversion table set in the adjustment/conversion unit in the fifth embodiment.

FIGS. 11A to 11C are diagrams showing the configuration, processing, and color conversion table of a portion including an achromatic color adjustment feature and conversion feature in the fifth embodiment. This embodiment is different from the first embodiment in terms of the achromatic color adjustment feature 46 and Lab data-to-CMY data conversion feature 48 which are associated with a printer. The other components are identical to those in the first embodiment. The common color space is therefore the Lab color space. The color space inherent to a device is the CMY color space. In the fifth embodiment, the achromatic color conversion feature 46 is preceded by an LCH color adjustment feature 71, and the conversion feature 48 is succeeded by a device space adjustment feature 75. The LCH color adjustment feature 71 consists of a Lab data-to-LCH data conversion feature 72 for converting Lab data into LCH data, an LCH color adjustment feature 73 for adjusting colors using data expressed in the LCH color space, and an LCH data-to-Lab data conversion feature 74 for converting LCH data representing adjusted colors into Lab data. In the LCH color space, element L denotes lightness, element C denotes chroma, and element H denotes hue. Colors expressed in the LCH color space are quite analogous to colors perceived by a human being. When colors are adjusted using data expressed in the LCH color space as they are in this embodiment, the work of adjustment becomes very simple. A device-inherent space adjustment feature 75 is a feature for adjusting colors using data expressed in a device-inherent color space.

The adjustment performed by the LCH color adjustment feature 73 is achieved by, for example, as shown in FIG. 11B, moving a point LCH. As a result, a color conversion table such as the one shown in FIG. 11C is created. In reality, assuming that sets of elements L, C, and H whose values are unchanged are L1, C1, and H1, etc., and Ln, Cn, and Hn, and sets of elements L, C, and H whose values are changed are L1', C1', and H1', etc., and Ln', Cn', and Hn', elements L', C', and H' obtained by adjusting the input elements L, C, and H are calculated as described below. The two colors whose hue levels immediately precede and succeed the value of an element H of the input set of elements are selected and shall be represented as data items LxCxHx and LyCyHy. Data items obtained by changing the data items LxCxHx and LyCyHy shall be Lx'Cx'Hx' and Ly'Cy'Hy'. Assuming that αx=Lx'/Lx, αy=Ly'/Ly, βx=Cx'/Cx, βy=Cy'/Cy, θx=Hx'−Hx, and θy=Hy'−Hy are established, the elements L', C', and H' are expressed as follows:

$$L' = \alpha x \times \frac{Hx - H}{Hx - Hy} \times \frac{C}{Cx} \times L + \alpha y \times \frac{H - Hy}{Hx - Hy} \times \frac{C}{Cy} \times L$$

$$C' = \beta x \times \frac{Hx - H}{Hx - Hy} \times C + \beta y \times \frac{H - Hy}{Hx - Hy} \times C$$

$$H' = \theta x \times \frac{Hx - H}{Hx - Hy} + \theta y \times \frac{H - Hy}{Hx - Hy} \times H$$

where $Hx \geq H > Hy$, $Cx \neq 0$, and $Cy \neq 0$ are established. For adjusting a level of hue H, a range of adjustment must be restricted so that $\theta x + Hx \leq \theta y + Hy$ can be satisfied.

The configuration employed in the fifth embodiment, that is, the configuration in which adjustment to be performed using data expressed in a common color space is carried out by converting Lab data into LCH data is also adaptable to a feature associated to another device.

FIGS. 12A to 12C are diagrams showing the configuration, processing, and color conversion table of a portion including an achromatic color adjustment feature and conversion feature in the sixth embodiment. The sixth embodiment is different from the fourth embodiment in the point that elements a and b are adjusted but a lightness curve is not adjusted unlike that in the fourth embodiment. The achromatic color adjustment feature 45 is preceded by an ab adjustment feature 76 for adjusting the characteristics (curves) of elements a and b. The ab adjustment feature 76 is composed of an a adjustment feature 77 and b adjustment feature 78 for mutually independently adjusting elements a and b. Adjustment performed by the a adjustment feature 77 and b adjustment feature 78 is, as shown in FIG. 12B, achieved by changing a curve (relationship of correspondence) arbitrarily except a black point indicating elements a and b of zeroes. In reality, a color adjustment table such as the one shown in FIG. 12C is created on the basis of magnitudes of adjustment and stored. Values not listed are calculated by interpolation, whereby the curve is changed. The configuration employed in the sixth embodiment is also adaptable to a feature associated with another device.

FIGS. 13A and 13B are diagrams showing the configuration and selection table of a portion including a conversion feature and achromatic color adjustment feature in the seventh embodiment. The seventh embodiment is different from the first embodiment in a point that the conversion feature and achromatic color adjustment feature are separated from a device and shared by a plurality of devices A, B, and C that are not shown. In the seventh embodiment, two conversion features, a conversion feature A 85 and a conversion feature B 86, are included and selective. One color adjustment feature 84 handles data expressed in a color space inherent to the device. It is possible to designate whether or not to use the color adjustment feature 84. Furthermore, a second color space adjustment feature 87 composed of three adjustment features is included for handling data expressed in a second color space. It is possible to designate whether or not to use each of the three adjustment features. The three adjustment features handling data expressed in the second color space are a brightness adjustment feature 88, chromatic color adjustment feature 89, and achromatic color adjustment feature 90. The achromatic color adjustment feature 90 is identical to the aforesaid ones. FIG. 13B shows an example of the selection table. As seen from FIG. 13B, various combinations are feasible. The devices A, B, and C may be input devices or output devices.

As apparent from the seventh embodiment, the conversion feature and achromatic color adjustment feature need not always be associated with each device but may be included in the image information server 21.

In the first to seventh embodiments, the contents of processing of adjustment features and achromatic color adjustment features associated with devices are set mutually independently. However, an input device having features whose contents of processing are thus set does not take account of the characteristic of an output device when producing color image data. This poses a problem in that, if the color image data is supplied to the output device as it is, an image cannot be reproduced successfully. One of relevant problems is a problem that a color domain corresponding to color image data does not match with a color domain handled by an output device. The eighth embodiment is an embodiment which attempts to cope with the problem.

Figure 14A:
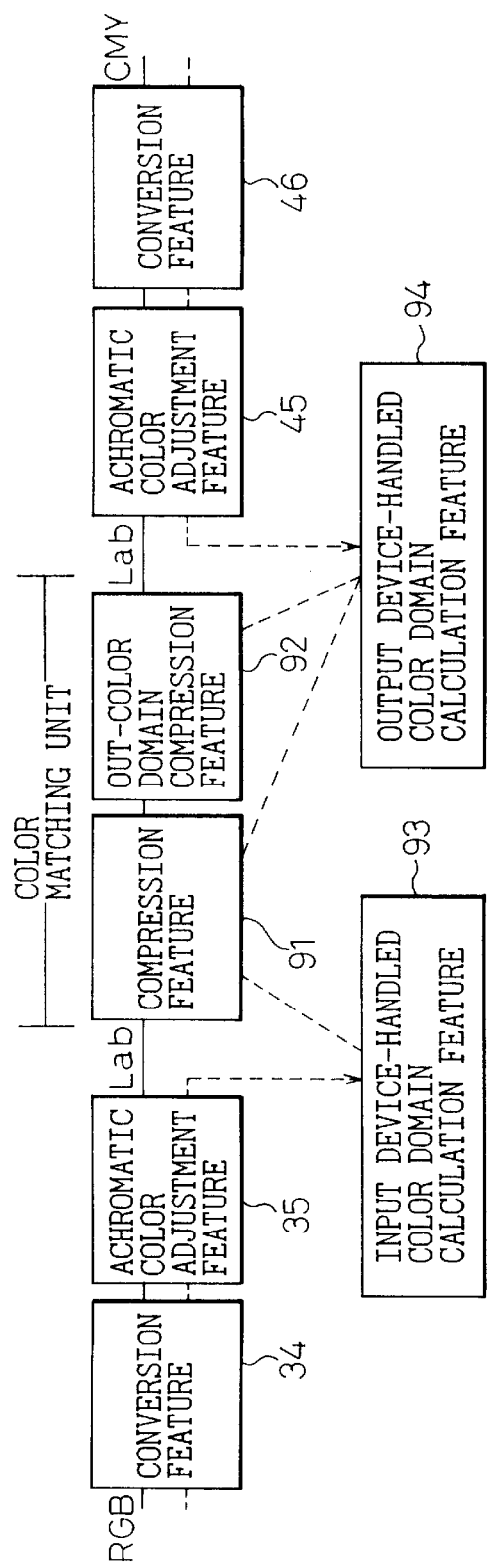
FIG. 14A is a diagram showing the configuration of a processing system in the eighth embodiment.
Figure 14B:
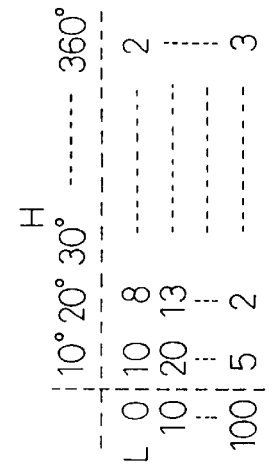
FIG. 14B shows a table listing color domains handled by an input device which is set in the processing system in the eighth embodiment.
Figure 14C:
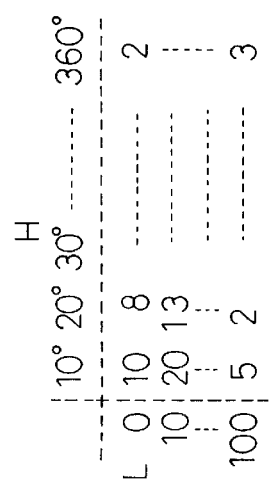
FIG. 14C shows a table listing color domains handled by an output device which is set in the processing system in the eighth embodiment.

FIGS. 14A to 14C are diagrams showing the configuration of a processing system in the eighth embodiment, color domains handled by an input device, and color domains handled by an output device. The configuration shown in FIG. 14A is concerned with a system ranging from a conversion feature associated with an input device to a conversion feature associated with an output device. All the components of the system may be incorporated in the image information server 21. Herein, a description will proceed on the assumption that the conversion feature 34 and achromatic color adjustment feature 35 are incorporated in an input device, and a compression feature 91, an out-color domain compression feature 92, an input device-handled color domain calculation feature 93, an output device-handled color domain calculation feature 94, the achromatic color adjustment feature 45, and the conversion feature 46 are incorporated in an output device.

The processing system in the eighth embodiment is an example in which a color space inherent to the input device is the RGB color space, a color space inherent to the output device is the CMY color space, and the common color space is the Lab color space. The achromatic color adjustment feature 35 in the input device outputs, as do the ones in the aforesaid embodiments, Lab data whose elements a and b are zeroes and which represents a color thought of as an achromatic color by an image creator. The input device-handled color domain calculation feature 93 calculates a color domain corresponding to the Lab data. Calculation of a color domain is achieved by, for example, as in the fifth embodiment, converting Lab data into LCH data and then describing a color domain in the form of a set of different levels of lightness and hue and a maximum level of chroma associated with the different levels of lightness and hue. A color domain to be provided by the color domain calculation feature 93 may be designated arbitrarily by a user. In this case, a color domain can be compressed constantly irrespective of Lab data. An output reflecting a difference of Lab data from another Lab data can be produced. The output device-handled color domain calculation feature 94 describes a range of colors that can be output from a device in the form of different levels of lightness and hue and maximum levels of chroma associated with the different levels of lightness and hue according to a method to be described later. FIG. 14B shows an example of thus obtained color domains handled by the input device, and FIG. 14C shows an example of color domains handled by the output device. In compression performed by the compression feature 91, two color domains must be matched with each other while an achromatic color is maintained. The compression is, for example, carried out in order to match the value of element L of LCH data with the value of element L in a color domain handled by the output device. It is then checked to see if the value of element C of LCH data resulting from the compression falls below the value of element C of the color domain handled by the output device. If the value of element C falls below the value of element C of the color domain, the LCH data is output to the achromatic color adjustment feature 45 as it is. If the value of element C of the LCH data exceeds the value of element C of the color domain handled by the output device, the out-color domain compression feature 92 stores the values of elements L and H and compresses the value of element C exceeding the value of element C of the color domain so that the value of element C will fall below the value of element C of the color domain.

Next, a procedure followed by the output device-handled color domain calculation feature 94 will be described. The processing is carried out as described below. LCH data whose elements L, C, and H have any of various combinations of values is converted into Lab data. The resultant Lab data is converted by the achromatic color adjustment feature 45 and conversion feature 46, whereby CMY data is obtained. It is then judged whether or not the value of the CMY data falls within a defined range. If the value of the CMY data falls within the range, the LCH data falls below a color domain. If the value exceeds the range, the LCH data exceeds the color domain. This sequence is repeated for each combination of values of elements L and H, thus calculating color domains expressed in the LCH color space.

FIG. 15 is a flowchart describing the procedure of color domain calculation in the eighth embodiment. At step 501, the first combination of values of elements L and H of LCH data is produced. At step 502, initialization is carried out. 10 is assigned to δ, and the value of element C is set to 0. At step 503, a value of element C associated with the values of the elements L and H is combined with the values of the elements L and H in order to produce LCH data. At step 504, the LCH data is converted into CMY data. At step 505, it is judged if the value of the CMY data falls within a defined range. For example, it is judged if the value of the CMY data falls within a range from level 0 to 255. If the value exceeds the defined range, the value is too large. At step 506, the value to be assigned to δ is halved and thus renewed. At step 507, the new δ value is subtracted from the value of element C, and thus element C assumes a new value. Control is then returned to step 503. If the value falls within the defined range, it is conceivable that the range may be wider. At step 508, it is judged if the δ value is larger than 1. If the δ value is smaller than 1, the value of element C has approached a boundary value due to repetition of processing. Control is then passed to step 510. If the δ value is larger than 1, the value of element C is increased by the δ value and thus renewed. Control is then returned to step 503. By repeating the foregoing steps, the value of element C gets smaller gradually. The value of element C approaches the boundary value of a color domain, and the δ value is judged to be smaller than 1 at step 508. At step 510, the combination of the values of elements L, C, and H attained at that time is considered as the color domain and stored. At step 511, it is judged if the foregoing processing has been completed for all combinations of values of elements L and H. If the processing has not been completed, control is returned to step 501. A new combination of values of elements L and H is produced, and a boundary value of element C relative to the values of elements L and H is calculated. This sequence is continued until all combinations of values of elements L and H are handled.

The processing of the output device-handled color domain calculation feature 94 may be carried out according to another procedure. The ninth embodiment presents an example of another procedure. In the ninth embodiment, a combination of values of elements of a color to be handled by a device is inversely converted and further converted into LCH data. Thus, a corresponding point in the LCH space is determined. A corresponding point distributed at an outermost position is adopted as a color domain. To be more specific, the LCH space is divided into domains in units of given widths along axes of elements L and H, for example, in units of 10° along the axis of element H and 10 along the axis of element L. Each domain is defined so that a point within the domain at which element C assumes a maximum value will lie on the boundary of the domain. This processing is performed on all the domains in order to determine color domains. If no corresponding point is defined within a domain, points in an adjoining domain are used to interpolate a maximum value of element C.

Figure 16:
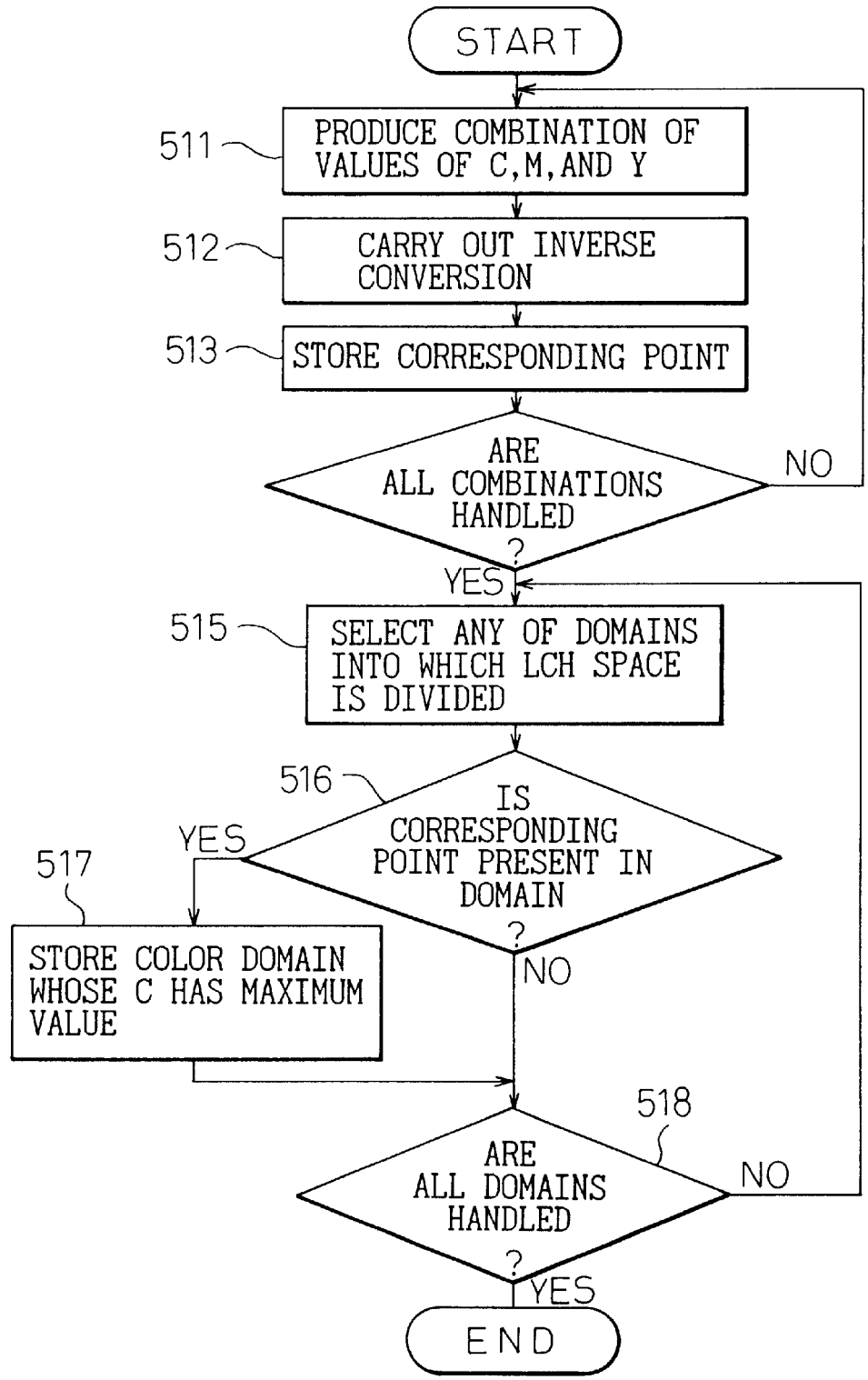
FIG. 16 is a flowchart describing a procedure of color domain calculation in the ninth embodiment.

FIG. 16 is a flowchart describing color domain calculation carried out by the output device-handled color domain calculation feature 94 in the ninth embodiment. At step 511, a combination of values of elements C, M, and Y is produced in units of, for example, 10. At step 512, CMY data whose elements C, M, and Y have a produced combination of values is converted into Lab data and then inversely converted into LCH data. Thus, a corresponding point in the LCH is calculated, and then stored at step 513. At step 514, it is judged if the processing has been completed relative to all combinations of values of elements L and H. The processing is continued until it is completed relative to all the combinations. At step 515, the LCH space is divided into domains in units of given widths along axes of elements L and H, for example, in units of 10° along the axis of element H and 10 along the axis of element L. At step 516, it is judged if any corresponding point is present within a domain. If corresponding points are present, any of a plurality of corresponding points at which element C assumes a maximum value is stored as a boundary point. If only one corresponding point is present, the point is stored. At step 518, it is judged if the processing has been completed relative to all domains. The processing is continued until it is completed relative to all the domains. Boundary points thus obtained are color domains.

Figure 17A:
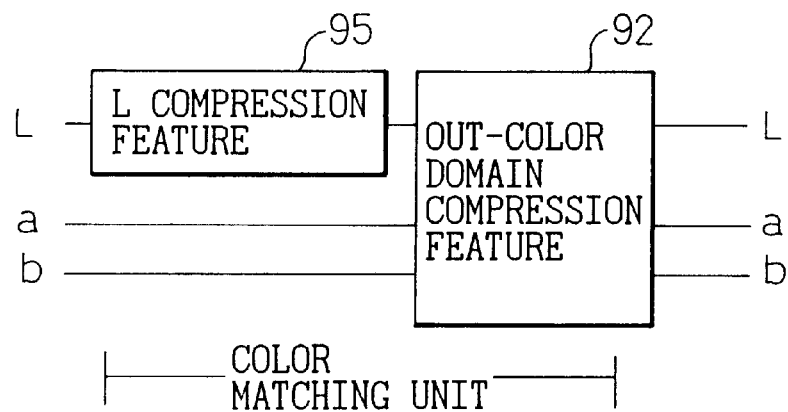
FIG. 17A is a diagram showing the configuration of a compression unit in the tenth embodiment.
Figure 17B:
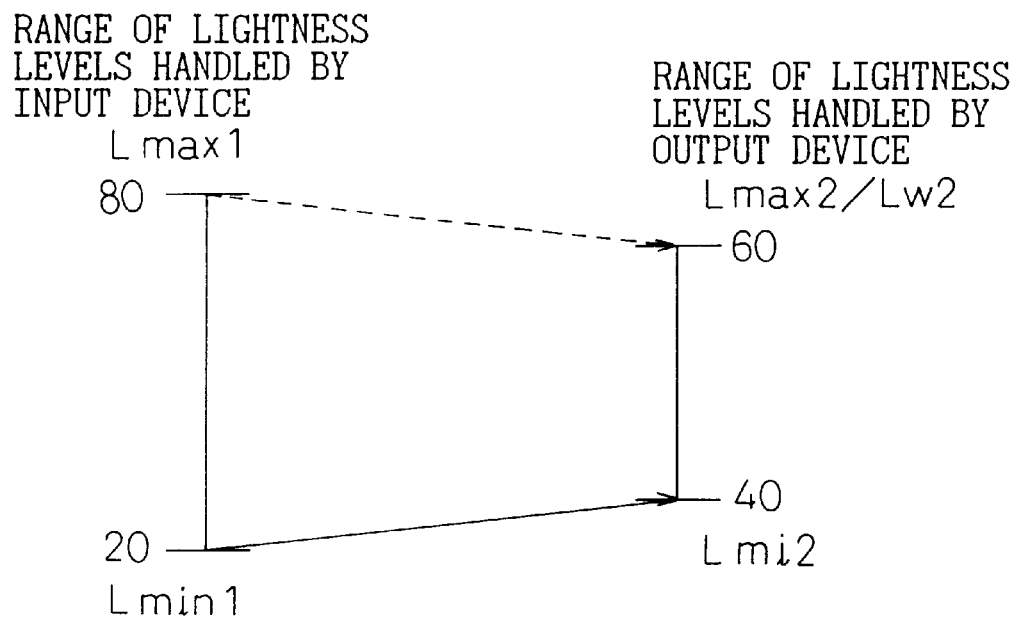
FIG. 17B is a diagram showing processing of the compression unit in the tenth embodiment.

Next, compression of a color domain will be described. FIGS. 17A and 17B are diagrams showing the configuration and processing of a color domain compression unit in the tenth embodiment. As shown in FIG. 17A, in the tenth embodiment, an L compression feature 95 is included for compressing a lightness level. Original values of elements a and b are maintained. The L compression feature 95 carries out processing, as shown in FIG. 17B, so that a range of levels of lightness specified in color image data will be matched with a range of levels of lightness to be handled by an output device. If the range of levels of lightness to be handled by an output device is larger than the range of levels of lightness specified in color image data, enlargement is carried out instead of compression. However, the term compression is employed generally. Specifically, a maximum level of lightness specified in color image data shall be Lmax1, and a minimum level of lightness shall be Lmin1. A maximum level of lightness that is an element of a color domain to be handled by an output device shall be Lmax2, and a minimum level of lightness shall be Lmin2. Input data shall be Lab, and output data shall be L'a'b'. Transformation expressions are given as follows:

$$L'=(L-L\min1)/(L\max1-L\min1)*(L\max2-L\min2)+L\min2$$

$$a'=a$$

$$b'=b$$

Moreover, in the tenth embodiment, assuming that an output device is a device for forming an image on paper, such as a printer, a maximum level of lightness is determined by the lightness of the white color of paper. Assuming that the level of lightness of the white color of paper is Lw2, the above transformation expressions may be rewritten as follows:

$$L'=(L-L\min1)/(L\max1-L\min1)*(Lw2-L\min2)+L\min2$$

$$a'=a$$

$$b'=b$$

Figure 18A:
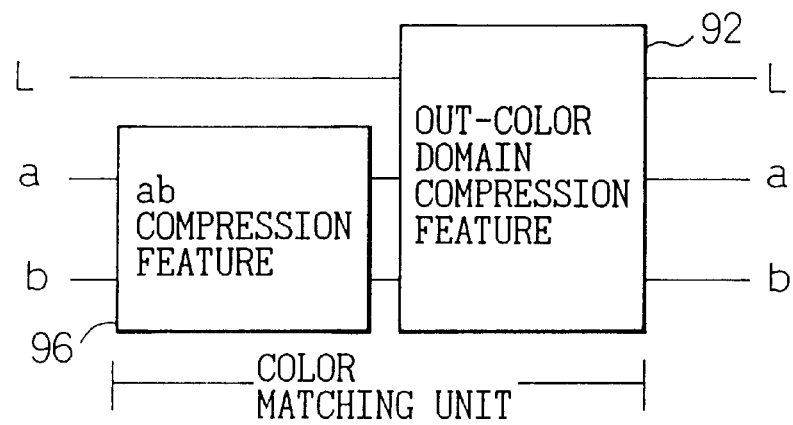
FIG. 18A is a diagram showing the configuration of a compression unit in the eleventh embodiment.
Figure 18B:
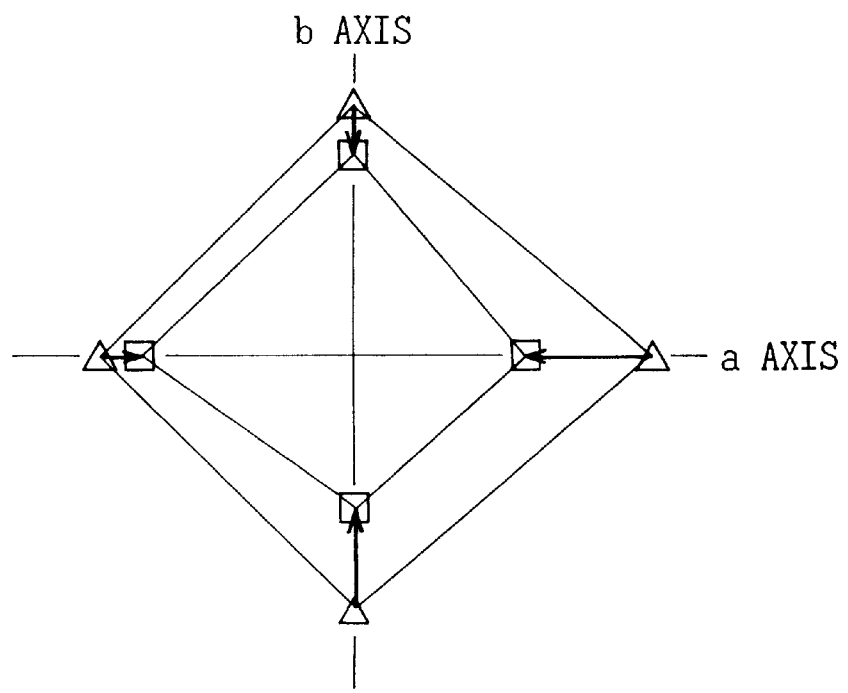
FIG. 18B is a diagram showing processing of the compression unit in the eleventh embodiment.

The eleventh embodiment is an example of compressing a color domain in terms of elements a and b. As shown in FIG. 18A, in the eleventh embodiment, an ab compression feature 96 is included for compressing values of elements a and b. Original value of element L is maintained. The ab compression feature 96 carries out processing, as shown in FIG. 18B, so that ranges of values of elements a and b specified in color image data will be matched with the ranges of values of elements a and b of colors to be handled by an output device in relation to each level of lightness. Specifically, the expressions [5] concerning elements C and H described in the fifth embodiment are employed.

FIG. 19 is a diagram showing the configuration of a processing system in the twelfth embodiment. In this embodiment, a plurality of output devices shall exhibit similar characteristics concerning colors. A certain device carries out color matching, and another device provides an approximate output using processed data provided by the device. An output device for carrying out color matching shall be referred to as an approximation object device, and an output device for providing an approximate output shall be referred to as an approximate output device. In FIG. 19, reference numeral 103 denotes an approximation object device, and 104 denotes an approximate output device. The approximation object device 103 and approximate output device 104 each include the achromatic color adjustment feature 45 and conversion feature 46. Moreover, color matching features 101 and 102 for adjusting images output from the approximation object device 103 and approximate output device 104 are associated with the approximation object device 103 and approximate output device 104. The color matching features 101 and 102 each include the compression feature 91 and out-color domain compression feature 92. Image data processed by the color matching feature 101 is output to the approximation object device 103 and to the out-color domain compression feature 92 in the color matching feature 102 associated with the approximate output device 104, and then supplied from the approximate output device 104. Owing to this configuration, for example, when paper handled by the approximation object device 103 is yellow and paper handled by the approximate output device 104 is white, the achromatic color adjustment features 45 in the approximation object device 103 and approximate output device 104 carries out adjustment so that gray will be displayed in gray. The impression of an image is therefore maintained.

Figure 20:
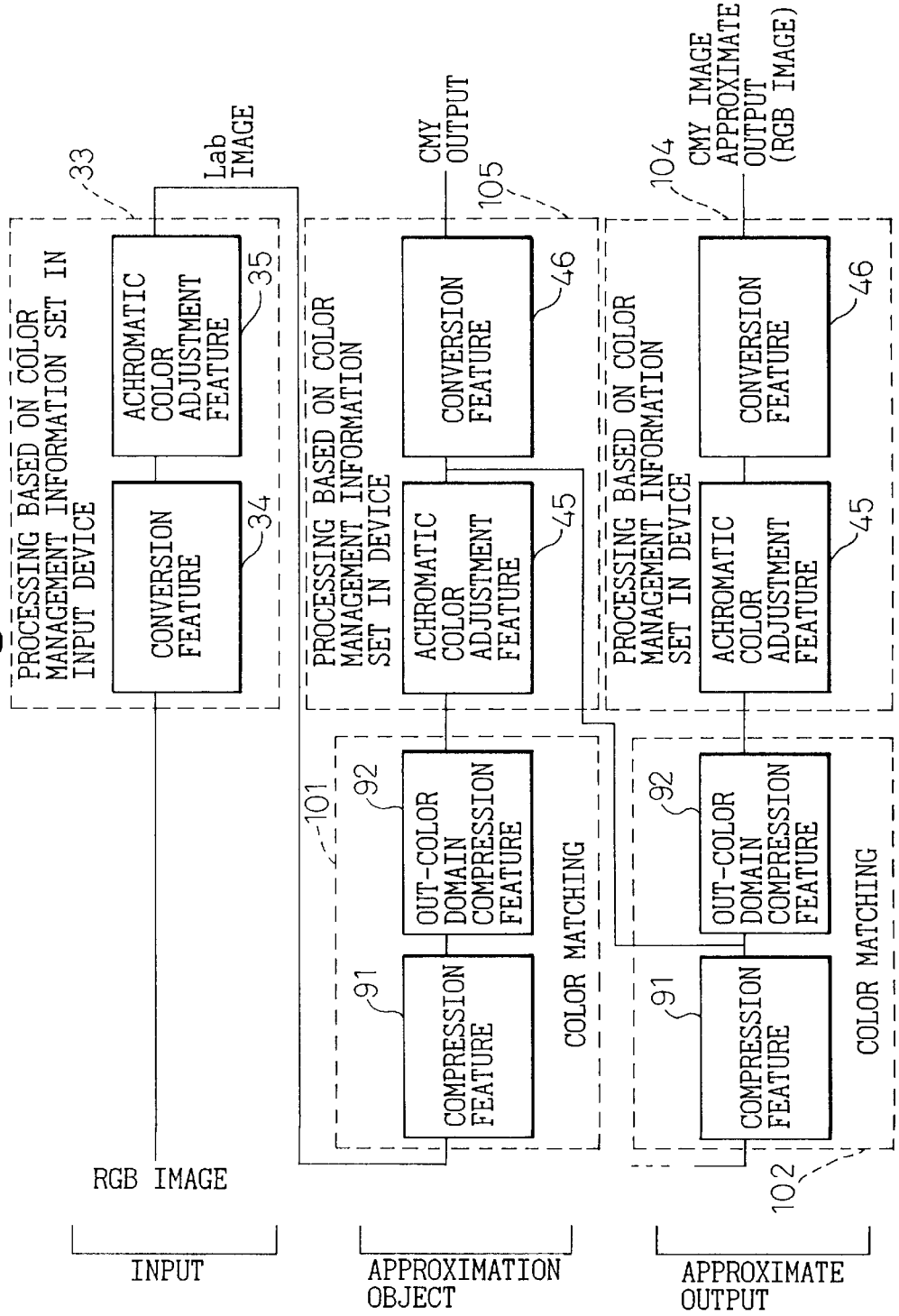
FIG. 20 is a diagram showing the configuration of a processing system in the thirteenth embodiment.

FIG. 20 is a diagram showing the configuration of a processing system in the thirteenth embodiment. This embodiment is different from in the twelfth embodiment the point that although image data processed by the color matching feature 101 is output to the out-color domain compression feature 92 in the color matching feature 102 associated with the approximate output device 104 in the twelfth embodiment, an output of the achromatic color adjustment feature 45 in the approximation object device 103 is input to the out-color domain compression feature 92 in the color matching feature 102. Owing to this configuration, the approximate output device 104 can provide an output that is like a copy of an output of the approximation object device 103. For example, when paper handled by the approximation object device 103 is yellow and paper handled by the approximate output device 104 is white, the blank area in white paper is displayed in yellow. Thus, a copy can be produced.

For providing an approximate output, the out-color domain compression feature 92 regards a distance from a color domain obtained by carrying out out-color domain compression as a color difference. If the color difference exceeds a defined value, an output of an approximate output device is set to a certain color. This makes it possible to recognize at sight what part of an image is deformed during color adjustment or image manipulation because the data representing a color of the part exceeds a color domain.

For providing an approximate output, if a conversion feature carries out processing of changing a color, such as color domain compression, an output of the conversion feature must be input to an approximate output device. In this case, an inverse conversion feature is included for inversely converting an output of the conversion feature, and an output of the inverse conversion feature is input to the approximate output device.

Figure 21:
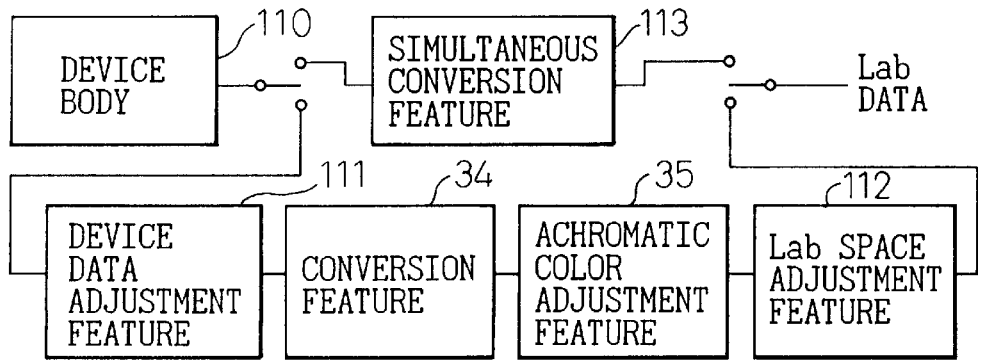
FIG. 21A is a diagram showing the configuration of a conversion/adjustment unit in the fourteenth embodiment.
FIG. 21B is a diagram showing a conversion table used for conversion and adjustment in the fourteenth embodiment.

FIGS. 21A and 21B are diagrams showing the configuration of an input device in the fourteenth embodiment and a conversion table employed. Herein, a color space inherent to a device is the RGB color space, and RGB data is converted into data expressed in the Lab color space and then output. As shown in FIG. 21A, the input device in the fourteenth embodiment comprises, like the one in the third embodiment, a device data adjustment feature 111 for adjusting an output of a device body 110 in the RGB color space inherent to the device, an RGB data-to-Lab data conversion feature 34, an achromatic color adjustment feature 35, a Lab space adjustment feature 112 for adjusting an output of the achromatic color adjustment feature in the Lab space, a simultaneous conversion feature 113 for carrying out the processing of these features simultaneously, and a switching feature for selecting either a system for operating the four features successively or operating the simultaneous conversion feature 113. When a feature is realized with a conversion table, conversion carried out by the feature is processing of searching for an associated value. When a feature is realized with transformation expressions, the conversion is an algebra of matrices. If the conversion is carried out sequentially, the time required for calculation gets longer. These features are required to be adjustable independently. Once adjustment is completed, the features need not be adjusted any longer. The simultaneous conversion feature 113 is included for carrying out conversions supposed to be carried by the features. After adjustment is completed, the simultaneous conversion feature 113 is operated. Consequently, processing should be carried out only once, and the processing time is reduced to a quarter.

FIG. 21B is a diagram showing the contents of a conversion table realizing the simultaneous conversion feature 113. As illustrated, the processing of the device data adjustment feature 111 is to change the characteristic curves of gammas in relation to elements R, G, and B. A conversion table realizing the conversion feature 34 is a table of Lab data items in relation to RGB data items each pair of which has a difference of 2 between them. The processing of the achromatic color adjustment feature 35 is to obtain changes in value of elements a and b relative to the values of element L of 0 and 100. The processing of the Lab space adjustment feature 112 is correction of a gammas of element L. The simultaneous conversion feature 113 for simultaneously carrying out the processing of the four features is realized with a conversion table. For creating the conversion table of the simultaneous conversion feature 113, Lab data items are calculated by processing RGB data items, each pair of which has a difference of 2, using the device data adjustment feature 111, conversion feature 34, achromatic color adjustment feature 35, and Lab space adjustment feature 112, and then listed in the form of a table.

FIG. 22 is a diagram showing the structure of image information output from the simultaneous conversion feature 113 in the fourteenth embodiment. Information indicating the contents of the processing of the device data adjustment feature 111, conversion feature 34, achromatic color adjustment feature 35, Lab space adjustment feature 112, and simultaneous conversion feature 113, which is provided in the form of a conversion table in this embodiment, is appended to image data. By appending this kind of information to image data, it can be understood which output device is intended to be used to reproduce the image. If the output device is not at hand, the output device may be regarded as an approximate object device and another device can be used to reproduce the image. When color management information set in an output device is modified, if the modified part of the information is replaced with original data or an approximate output is produced, an image can be reproduced according to unmodified color management information set previously in the device.

As described above, according to the present invention, the delicate problem of color reproduction in a conventional color image processing system is solved by managing a color handled by a device including the three portions i.e.; a portion for eliminating a difference in color characteristic of the device from that of another device, a portion for eliminating a difference in the use environment (appearance of a color) of the device from another, and realization of an individual's tastes on the color handled by the device. Even in a multi-vendor system, a user can easily manage the colors handled by a device and match the colors.

Moreover, a gray level can be matched between devices, and a color domain can be compressed readily while the gray level is maintained. Whatever kind of device is connected, the appearance of an image can remain consistent.

Moreover, numerous adjustment information items can be held as color management information set in a device. Fine adjustment or readjustment can be carried out readily.

Furthermore, although the fact that the number of adjustment features is large may be a drawback, when a management feature is included, any of the adjustment features can be identified readily. Moreover, when unnecessary processing is not carried out, the processing speed of a system can be improved.

Furthermore, even when devices handling different color domains are concerned, if compression is carried out in two steps, an output image can be made consistent with an input image.

Furthermore, since an approximate output can be produced, a result of color adjustment can be grasped immediately. Moreover, printing may be omitted. This leads to a reduction in cost.

Furthermore, when color information concerning a device is appended to an image, a device for producing a final output can be changed from one to another or an approximate output of the final output can be produced.

What is claimed is:

1. A color image information processing system, comprising:
    at least one color image information input device for producing color image information;
    at least one color image information output device for producing a color image on the basis of the color image information;
    an inherent color space-to-common color space conversion feature for converting color image information produced by said color image information input device and expressed in a color space inherent to said color image information input device into color image information expressed in a given color space;
    a common color space-to-inherent color space conversion feature for converting color image information expressed in the given color space into color image information expressed in the color space inherent to said color image information output device;
    a first achromatic color information processing feature for adjusting color image information converted to be expressed in the given color space by means of said inherent color space-to-common color space conversion feature so that an achromatic portion of the color image information will have a value indicating a color with only an achromatic component in the given color space; and
    a second achromatic color information processing feature for adjusting a portion of the converted color image information that should only indicate a color with an achromatic component, the color image information to be converted by said common color space-to-inherent color space conversion feature and expressed in the given color space, so that if the converted color has non-achromatic components, it is adjusted such that the image information will represent a color with only an achromatic component.

2. A color image information processing system according to claim 1, wherein said given color space is the uniform color space.

3. A color image information processing system according to claim 2, further comprising:
    an input image conversion pre-adjustment feature for adjusting color image information not converted by said inherent color space-to-common color space conversion feature and expressed in the color space inherent to said color image information input device;
    an input image conversion post-adjustment feature for adjusting color image information adjusted by said first achromatic color adjustment feature and expressed in the uniform color space;
    an output image conversion pre-adjustment feature for adjusting color image information not adjusted by said second achromatic color adjustment feature and expressed in the uniform color space; and
    an output image conversion post-adjustment feature for adjusting color image information converted to be expressed in the color space inherent to said color image information output device by means of said common color space-to-inherent color space conversion feature.

4. A color image information processing system according to claim 2, further comprising:
    a first color domain calculation feature for calculating a first color domain, which is a color domain in the given color space, corresponding to color image information output from said first achromatic color adjustment feature;
    a second color domain calculation feature for calculating a second color domain, which is a color domain expressed in a second color space, indicating a color that can be output by said color image information output device; and
    a first compression feature for compressing color image information according to a given algorithm on the basis of the first color domain and second color domain.

5. A color image information processing system according to claim 4, further comprising a second compression feature that when a color domain corresponding to color image information compressed by said first compression feature exceeds the second color domain, further compresses a portion of the color image information corresponding to an exceeding element of the color domain according to a second given algorithm.

6. A color image information processing system according to claim 5, wherein said second color domain calculation feature includes an in-range judgment feature for detecting if a value obtained by converting color image information by means of said common color space-to-inherent color space conversion feature associated with said color image information output device falls within a defined range; and said first compression feature and second compression feature adjust magnitudes of compression thereof on the basis of the result of detection performed by said in-range judgment feature.

7. A color image information processing system according to claim 4, wherein said second color domain calculation feature calculates the second color domain using a domain in the uniform color space defined by inversely converting an output of said common color space-to-inherent color space conversion feature that converts an input of said color image information output device.

8. A color image information processing system according to claim 4, wherein said first color domain calculation feature includes a color domain setting feature for use in arbitrarily setting the first color domain, and outputs the first color domain set using said color domain setting feature.

9. A color image information processing system according to claim 4, wherein said first compression feature includes a lightness domain calculation feature for calculating a first lightness domain defined with a maximum level and minimum level of lightness serving as an element of the first color domain, and a second lightness domain defined with a maximum level and minimum level of lightness serving as an element of the second color domain, and a lightness conversion feature for converting color image information so that the first and second lightness domains will agree with each other.

10. A color image information processing system according to claim 9, wherein said color image information output device is a device for outputting an image on paper, and said lightness domain calculation feature specifies the level of lightness of the paper as the maximum level of lightness.

11. A color image information processing system according to claim 4, wherein said compression feature includes a chroma conversion feature for converting color image information so that a maximum level of chroma relative to each hue expressed in the first color space will agree with a maximum level of chroma relative to each hue expressed in the second color space.

12. A color image information processing system according to claim 4, wherein two or more color image information output devices exhibit similar characteristics; and when one of the two or more color image information output devices is used to output color image information, color image information compressed by said first and second compression features associated with another color image information output device exhibiting a similar characteristic is input to said second compression feature associated with the one color image information output device.

13. A color image information processing system according to claim 4, wherein two or more color image information output devices exhibit similar characteristics; and when one of the two or more color image information output devices is used to output color image information, color image information compressed by said first and second compression features associated with another color image information output device exhibiting a similar characteristic and adjusted by said second achromatic color adjustment feature is input to said second compression feature associated with the one color image information output device.

14. A color image information processing system according to claim 12, wherein said second compression feature changes a portion of color image information representing a color image and being compressed by said second compression feature, of which the width is equal to or larger than a given value, into a given value.

15. A color image information processing system according to claim 13, wherein said second compression feature changes a portion of color image information representing a color image and being compressed by said second compression feature, of which the width is equal to or larger than a given value, into a given value.

16. A color image information processing system according to claim 2, further comprising a simultaneous conversion feature having the capabilities of both said inherent color space-to-common color space conversion feature and first achromatic color information adjustment feature associated with said color image information input device, and a selection feature for designating whether or not said simultaneous conversion feature is to be operated.

17. A color image information processing system according to claim 16, wherein said simultaneous conversion feature appends information provided by said inherent color space-to-common color space conversion feature and first achromatic color information conversion feature to color image information converted by said simultaneous conversion feature.

18. A color image information input device for producing color image information expressed in a given color space, comprising:

an inherent color space-to-common color space conversion feature for converting color image information produced by said color image information input device and expressed in a color space inherent to said color image information input device into color image information expressed in the given color space; and an achromatic color information processing feature for adjusting a portion of the converted color image information that should only indicate a color with an achromatic component, the color image information converted to be expressed in the given color space by means of said inherent color space-to-common color space conversion feature, so that if the converted color has non-achromatic components, it is adjusted such that the image information will have a value indicating a color with only an achromatic component in the given color space.

19. A color image information input device according to claim 18, wherein said given color space is the uniform color space.

20. A color image information input device according to claim 19, wherein said achromatic color adjustment feature uses magnitudes of correction of levels of hue and chroma relative to any input levels of lightness to interpolate magnitudes of correction of levels of hue and chroma relative to each level of lightness, and appends the calculated magnitudes of correction of levels of hue and chroma relative to each level of lightness to color image information expressed in the uniform color space.

21. A color image information input device according to claim 19, wherein said inherent color space-to-common color space conversion feature has a plurality of transformation expressions used to convert the inherent color space to the given color space, and it can be designated which of the transformation expressions are to be used.

22. A color image information input device according to claim 18, further comprising an input image conversion pre-adjustment feature for adjusting color image information not converted by said inherent color space-to-common color space conversion feature and expressed in the color space inherent to said color image information input device, and an input image conversion post-adjustment feature for adjusting color image information adjusted by said first achromatic color adjustment feature and expressed in the uniform color space.

23. A color image information input device according to claim 22, wherein said input image conversion post-adjustment feature includes a lightness conversion feature for arbitrarily changing an output level of lightness expressed in the uniform color space in relation to an input level thereof.

24. A color image information input device according to claim 22, wherein said input image conversion post-adjustment feature includes an adjustment feature for adjusting the levels of lightness, hue, and chroma of any color, and an interpolation feature for interpolating an intermediate color using any colors adjusted by said adjustment feature according to a given algorithm.

25. A color image information input device according to claim 22, wherein said input image conversion post-adjustment feature includes a feature for arbitrarily changing a curve plotted using values of perceptive attributes of hue and chroma expressed in the uniform color space.

26. A color image information input device according to claim 22, wherein said input image conversion post-adjustment feature includes a plurality of different adjustment features, and a selection feature for selecting and arbitrarily combining any of said plurality of different adjustment features.

27. A color image information input device according to claim 18, further comprising a simultaneous conversion feature having the capabilities of both said inherent color space-to-common color space conversion feature and first achromatic color information adjustment feature associated with said color image information input device, and a selection feature for designating whether or not said simultaneous conversion feature is operated.

28. A color image information input device according to claim 27, wherein said simultaneous conversion feature appends information provided by said inherent color space-to-common color space conversion feature and first achromatic color information adjustment feature to color image information converted by said simultaneous conversion feature.

29. A color image information output device for producing a color image on the basis of color image information expressed in a given color space, comprising:
    a common color space-to-inherent color space conversion feature for converting color image information expressed in the given color space into color image information expressed in a color space inherent to said color image information output device; and
    an achromatic color information processing feature for adjusting a portion of the color image information expressed in the given color space that should indicate a color with only an achromatic component, the color image information to be converted by said common color space-to-inherent color space conversion feature, so that if the image information has non-achromatic components, it is adjusted such that the image information will represent a color with only an achromatic component.

30. A color image information output device according to claim 29, wherein said given color space is the uniform color space.

31. A color image information output device according to claim 30, wherein said achromatic color adjustment feature uses magnitudes of correction of levels of hue and chroma relative to any input levels of lightness to interpolate magnitudes of levels of hue and chroma relative to each level of lightness, and appends the calculated magnitudes of correction of levels of hue and chroma relative to each lightness to color image information expressed in the uniform color space.

32. A color image information output device according to claim 30, wherein said common color space-to-inherent color space conversion feature has a plurality of transformation expressions used to convert the inherent color space to the given color space, and it can be designated which of the transformation expressions are used.

33. A color image information output device according to claim 30, further comprising an output image conversion pre-adjustment feature for adjusting color image information not adjusted by said achromatic color adjustment feature and expressed in the uniform color space, and an output image conversion post-adjustment feature for adjusting color image information converted to be expressed in the color space inherent to said color image information output device by means of said common color space-to-inherent color space conversion feature.

34. A color image information output device according to claim 33, wherein said output image conversion pre-adjustment feature includes a lightness conversion feature for arbitrarily changing an output level of lightness expressed in the uniform color space in relation to an input level thereof.

35. A color image information output device according to claim 33, wherein said output image conversion pre-adjustment feature includes an adjustment feature for adjusting the levels of lightness, hue, and chroma of any color, and an interpolation feature for interpolating an intermediate color using any colors adjusted by said adjustment feature according to a given algorithm.

36. A color image information output device according to claim 33, wherein said output image conversion pre-adjustment feature includes a feature for arbitrarily changing a curve plotted using values of perceptive attributes of hue and chroma expressed in the uniform color space.

37. A color image information processing system, comprising:
    a color space conversion section converting color image information expressed in a first color space into converted color image information expressed in a second color space; and
    a processing section adjusting a portion of the converted color image information that should only indicate a color with an achromatic component, so that if the converted color has non-achromatic components, it is adjusted such that the image information will represent a color with only an achromatic component in the second color space.

38. A color image information processing system, comprising:
    a color space conversion section converting color image information expressed in a first color space into converted color image information expressed in a second color space; and
    a processing section adjusting a portion of the color image information that should only indicate a color with an achromatic component, so that if the image information has non-achromatic components, it is adjusted such that the image information will represent a color with only an achromatic component.

39. A color image information input device, comprising:
    a color space conversion section converting color image information expressed in a first color space inherent to said device into converted color image information expressed in a second color space; and
    a processing section adjusting a portion of the converted color image information that should only indicate a color with an achromatic component, so that if the converted color has non-achromatic components, it is adjusted such that the image information will represent a color with only an achromatic component in the second color space.

40. A color image information output device, comprising:
    a color space conversion section converting color image information expressed in a first color space into converted color image information expressed in a second color space inherent to said device; and
    a processing section adjusting a portion of the color image information that should only indicate a color with an achromatic component, so that if the image information has non-achromatic components, it is adjusted such that the image information will represent a color with only an achromatic component.

41. A method for producing color image information expressed in a given color space, comprising:
    converting color image information produced by a color image information input device and expressed in a color space inherent to the color image information input device into converted color image information expressed in the given color space; and
    adjusting a portion of the converted color image information that should only indicate a color with an achromatic component, so that if the converted color has non-achromatic components, it is adjusted such that the image information will have a value indicating a color with only an achromatic component in the given color space.

42. A method for producing a color image on the basis of color image information expressed in a given color space, comprising:

converting color image information expressed in the given color space into converted color image information expressed in a color space inherent to a color image information output device; and adjusting a portion of the color image information expressed in the given color space that should only indicate a color with an achromatic component, so that if the image information has non-achromatic components, it is adjusted such that the image information will represent a color with only an achromatic component.

43. A computer-readable medium encoded with a program for producing color image information expressed in a given color space, said program comprising functions for:

converting color image information produced by a color image information input device and expressed in a color space inherent to the color image information input device into converted color image information expressed in the given color space; and adjusting a portion of the converted color image information that should only indicate a color with an achromatic component, so that if the converted color has non-achromatic components, it is adjusted such that the image information will have a value indicating a color with only an achromatic component in the given color space.

44. A computer-readable medium encoded with a program for producing a color image on the basis of color image information expressed in a given color space, said program comprising functions for:

converting color image information expressed in the given color space into converted color image information expressed in a color space inherent to a color image information output device; and adjusting a portion of the color image information expressed in the given color space that should only indicate a color with an achromatic compound, so that if the image information has non-achromatic components, it is adjusted such that the image information will represent a color with only an achromatic component.

* * * * *